US010645516B2

(12) United States Patent
Horbach et al.

(10) Patent No.: US 10,645,516 B2
(45) Date of Patent: May 5, 2020

(54) VARIABLE ACOUSTIC LOUDSPEAKER SYSTEM AND CONTROL

(71) Applicant: HARMAN INTERNATIONAL INDUSTRIES, INCORPORATED, Stamford, CT (US)

(72) Inventors: Ulrich Horbach, Canyon Country, CA (US); Emil Badal, Tujunga, CA (US); Charles Hill, Simi Valley, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 5 days.

(21) Appl. No.: 15/693,253

(22) Filed: Aug. 31, 2017

(65) Prior Publication Data

US 2018/0063664 A1 Mar. 1, 2018

Related U.S. Application Data

(63) Continuation-in-part of application No. PCT/US2017/049543, filed on Aug. 31, 2017.

(Continued)

(51) Int. Cl.
*H04S 7/00* (2006.01)
*H04S 1/00* (2006.01)
(Continued)

(52) U.S. Cl.
CPC ............ *H04S 7/303* (2013.01); *G06F 3/0482* (2013.01); *G06F 3/0484* (2013.01);
(Continued)

(58) Field of Classification Search
CPC . H04S 1/007; H04S 7/40; H04S 7/302; H04S 7/305; H04S 7/303; H04S 3/008;
(Continued)

(56) References Cited

U.S. PATENT DOCUMENTS 3,473,428 A 10/1969 Phillips
3,816,830 A 6/1974 Giannini
(Continued)

FOREIGN PATENT DOCUMENTS

EP 1061769 A2 12/2000
EP 1962549 A2 8/2008
(Continued)

OTHER PUBLICATIONS

Moller et al., Circular Loudspeaker Array with Controllable Directivity, Audio Engineering Society, Convention Paper 8012, presented at the 128th Convention, May 22-25, 2010, London, UK, pp. 1-12.

(Continued)

*Primary Examiner* — Vivian C Chin
*Assistant Examiner* — Ubachukwu A Odunukwe
(74) *Attorney, Agent, or Firm* — Brooks Kushman P.C.

(57) ABSTRACT

An audio system is provided. The audio system has a first speaker assembly having a first steerable audio beam and a second speaker assembly having a second steerable audio beam. A control system is in communication with the first and second speaker assemblies and is programmed to receive a sweet-spot input signal indicative of a sweet-spot area having stereo surround sound. The controller commands the first and second speaker assemblies to adjust at least one of parameter of the first and second steerable audio beams so that the second steerable audio beam intersects the first steerable audio beam to form the sweet-spot area at the intersection.

20 Claims, 15 Drawing Sheets

Related U.S. Application Data

(60) Provisional application No. 62/465,621, filed on Mar. 1, 2017, provisional application No. 62/382,212, filed on Aug. 31, 2016.

(51) Int. Cl.

| | | |
|---|---|---|
| *H04R 5/02* | (2006.01) | |
| *H04S 3/00* | (2006.01) | |
| *G06F 3/0484* | (2013.01) | |
| *G06F 3/0481* | (2013.01) | |
| *G06F 3/0482* | (2013.01) | |
| *H04R 3/00* | (2006.01) | |
| *H04R 5/04* | (2006.01) | |
| *H04R 29/00* | (2006.01) | |
| *G06F 3/16* | (2006.01) | |
| *H04R 1/40* | (2006.01) | |

(52) U.S. Cl.
CPC ...... *G06F 3/04817* (2013.01); *G06F 3/04847* (2013.01); *H04R 3/00* (2013.01); *H04R 5/02* (2013.01); *H04R 5/04* (2013.01); *H04R 29/008* (2013.01); *H04S 3/008* (2013.01); *H04S 7/40* (2013.01); *G06F 3/04845* (2013.01); *G06F 3/165* (2013.01); *H04R 1/403* (2013.01); *H04R 2420/05* (2013.01); *H04R 2430/20* (2013.01); *H04S 2400/01* (2013.01); *H04S 2400/13* (2013.01)

(58) Field of Classification Search
CPC ....... H04S 2400/13; H04R 1/406; H04R 5/02; H04R 5/04; H04R 1/403; H04R 3/002; G06F 3/04817; G06F 3/165; G06F 3/0484
USPC .................. 381/17, 303, 307, 71.6
See application file for complete search history.

(56) References Cited

U.S. PATENT DOCUMENTS

| | | | |
|---|---|---|---|
| 8,139,816 | B2 | 3/2012 | French et al. |
| 8,295,498 | B2 | 10/2012 | Karlsson et al. |
| 9,241,213 | B2 | 1/2016 | French et al. |
| 9,749,747 | B1 | 8/2017 | Kriegel et al. |
| 2005/0169493 | A1 | 8/2005 | Horbach |
| 2006/0204022 | A1 | 9/2006 | Hooley et al. |
| 2008/0130413 | A1 | 6/2008 | Bachelor et al. |
| 2008/0155453 | A1 | 6/2008 | Othmer |
| 2008/0243278 | A1 | 10/2008 | Dalton et al. |
| 2008/0253577 | A1 | 10/2008 | Eppolito |
| 2009/0296954 | A1 | 12/2009 | Hooley et al. |
| 2010/0135505 | A1 | 6/2010 | Graebener et al. |
| 2011/0058677 | A1* | 3/2011 | Choi .............. H04R 5/04 381/17 |
| 2011/0103620 | A1* | 5/2011 | Strauss .......... H04S 3/00 381/150 |
| 2011/0246148 | A1 | 10/2011 | Gupta et al. |
| 2012/0030214 | A1 | 2/2012 | Branca et al. |
| 2012/0185769 | A1 | 7/2012 | Whitley |
| 2013/0058505 | A1 | 3/2013 | Munch et al. |
| 2013/0121515 | A1* | 5/2013 | Hooley .......... H04R 1/403 381/307 |
| 2013/0170647 | A1 | 7/2013 | Reilly et al. |
| 2013/0230176 | A1 | 9/2013 | Virette et al. |
| 2013/0259238 | A1 | 10/2013 | Xiang et al. |
| 2014/0095997 | A1 | 4/2014 | Vu et al. |
| 2014/0126753 | A1* | 5/2014 | Takumai ........ H04S 7/305 381/303 |
| 2014/0169569 | A1* | 6/2014 | Toivanen ....... H04R 5/04 381/17 |
| 2015/0098596 | A1 | 4/2015 | Noah |
| 2015/0208166 | A1* | 7/2015 | Raghuvanshi ... H04R 3/002 381/71.6 |
| 2016/0205477 | A1 | 7/2016 | Kuribayashi et al. |
| 2016/0353205 | A1 | 12/2016 | Munch |
| 2017/0195815 | A1 | 7/2017 | Christoph et al. |
| 2017/0223447 | A1 | 8/2017 | Johnson et al. |
| 2018/0060025 | A1 | 3/2018 | Hill et al. |
| 2018/0063665 | A1 | 3/2018 | Walker et al. |
| 2018/0136898 | A1 | 5/2018 | Shi et al. |

FOREIGN PATENT DOCUMENTS

| | | |
|---|---|---|
| WO | 2006022379 A1 | 3/2006 |
| WO | 2016028264 A1 | 2/2016 |
| WO | 2016048381 A1 | 3/2016 |
| WO | 2018045133 A1 | 8/2017 |

OTHER PUBLICATIONS

Gunness, The Design and Implementation of Line Arrays Using Digital Signal Processing, Eastern Acoustic Works, Whitinsville, MA, USA, presented to the Reproduced Sound 19 Conference, The Institute of Acoustics, Nov. 8, 2003, 27 pages.

Supplementary European Search Report of European Application No. 17847527.3 dated Feb. 19, 2020, 16 pages.

* cited by examiner $$L' = g(L - R) + (L + R) = \tfrac{1}{2}[L(1 + g) + R(1 - g)]$$

$$R' = g(R - L) + (L + R) = \tfrac{1}{2}[R(1 + g) + L(1 - g)]$$

g: [0, 2.0]

VARIABLE ACOUSTIC LOUDSPEAKER SYSTEM AND CONTROL

CROSS-REFERENCE TO RELATED APPLICATIONS

This application claims the benefit of U.S. provisional application Ser. No. 62/465,621, filed Mar. 1, 2017, and is a continuation-in-part and claims priority to International Application No. PCT/US2017/049543 filed Aug. 31, 2017, which claims the benefit of U.S. provisional application Ser. No. 62/382,212, filed Aug. 31, 2016, the disclosures of which are hereby incorporated in their entirety by reference herein.

TECHNICAL FIELD

Embodiments disclosed herein generally relate to an audio system for providing stereo surround sound.

BACKGROUND

High-end stereo products in the market today require the user to sit in one small "sweet spot" for optimal stereo imaging and spatial realism. If the consumer moves even from the left side of the sofa to the right side, the listening experience changes drastically. To experience truly immersive sound, the ambience, and the spatial cues of a live musical performance, the consumer must install complicated and expensive acoustic treatment in the listening room.

SUMMARY

According to at least one embodiment, an audio system is provided. The audio system has a first speaker assembly having a first steerable audio beam and a second speaker assembly having a second steerable audio beam. A control system is in communication with the first and second speaker assemblies and is programmed to receive a sweet-spot input signal indicative of a sweet-spot area having stereo surround sound. The controller commands the first and second speaker assemblies to adjust at least one of parameter of the first and second steerable audio beams so that the second steerable audio beam intersects the first steerable audio beam to form the sweet-spot area at the intersection.

In another embodiment, the at parameter includes at least one of a beam angle, a beam width, a delay and gain.

In another embodiment, the control system receives a setup signal indicating a separation distance between the first and second speaker assemblies and receives a sweet-spot location relative to locations of the first and second speaker assemblies. The controller calculates a beam angle and a beam distance each of the first and second steerable audio beams based on the separation distance and the sweet-spot location. The controller provides a digital signal processing (DSP) command to the first and second speakers to adjust the beam angle. The controller commands the first and second speaker assemblies to adjust a speaker delay and speaker a gain based on the beam distance of each of the first and second steerable audio beams.

In another embodiment, the speaker gain is adjusted inverse to a distance difference between first and second beam distances.

In another embodiment, the control system has a digital signal processing (DSP) controller programmed to receive the beam angle. The controller adjusts the beam angle of each of the first and second steerable audio beams.

In another embodiment, the DSP controller is programmed to receive a sweet-spot size. The DSP controller adjusts a beam width of each of the first and second steerable audio beams.

In another embodiment, the control system receives the sweet-spot input signal from a mobile device remote from the first and second speaker assemblies and control system.

In another embodiment, the audio system includes a mobile device in communication with the control system. The mobile device is configured to present, via a user interface, a display screen to receive user input of a sweet-spot input. The mobile device sends sweet-spot parameters to the control system.

In at least one embodiment, a method of controlling an audio system is provided. A sweet-spot input signal is received indicating of a sweet-spot area having stereo surround sound. An output signal is provided to adjust first and second steerable audio beams so that the second steerable audio beam intersects the first steerable audio beam to form the sweet-spot area at the intersection.

In another embodiment, adjusting the first and second steerable audio beams includes adjusting at least one of a beam angle, a beam width, a delay and gain.

In another embodiment, the method includes receiving a sweet-spot location. A beam angle is determined for each of the first steerable audio beam from a first speaker assembly and the second steerable audio beam from a second speaker assembly based on the sweet-spot location. A digital signal processing (DSP) command is provided to the first and second speaker assemblies to adjust the beam angle of each of the first and second steerable audio beams.

In another embodiment, the method includes determining a beam distance of each of the first and second steerable audio beams from the first speaker assembly and the second steerable audio beam from the second speaker assembly. A signal is provided to adjust the speaker delay and speaker gain based on the beam distance of each of the first and second steerable audio beams.

In another embodiment, the method includes receiving a size input of the sweet-spot area. A digital signal processing (DSP) command is provided to the first and second speaker assemblies to adjust a beam width of each of the first and second steerable audio beams based on the size input.

In another embodiment, the method includes receiving the sweet-spot input signal from a mobile device remote from each of a first speaker assembly and a second speaker assembly.

In another embodiment, the method includes receiving an input to move the sweet-spot location from a first location to a second location. A beam-steering command is provided to move the first and second steerable audio beams.

According to at least one embodiment, a non-transitory computer-readable medium tangibly embodying computer-executable instructions of a software program is provided. The software program is executable by a processor of a computing device to provide operations including providing a first signal to a form a first steerable audio beam. A second signal is provided to a form a second steerable audio beam that intersects the first steerable audio beam to form a sweet-spot area having stereo surround sound.

In another embodiment, an input a location of the sweet-spot area is received. Output parameters of the first and second steerable audio beams are determined based on the location.

In another embodiment, the output parameters include at least one of a beam angle, a beam width, a speaker gain and a speaker delay.

In another embodiment, the first signal is provided to a first speaker assembly. The second signal is provided to a second speaker assembly.

In another embodiment, an input is received to move the sweet-spot location from a first location to a second location. A signal is provided to move the first and second steerable audio beams.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
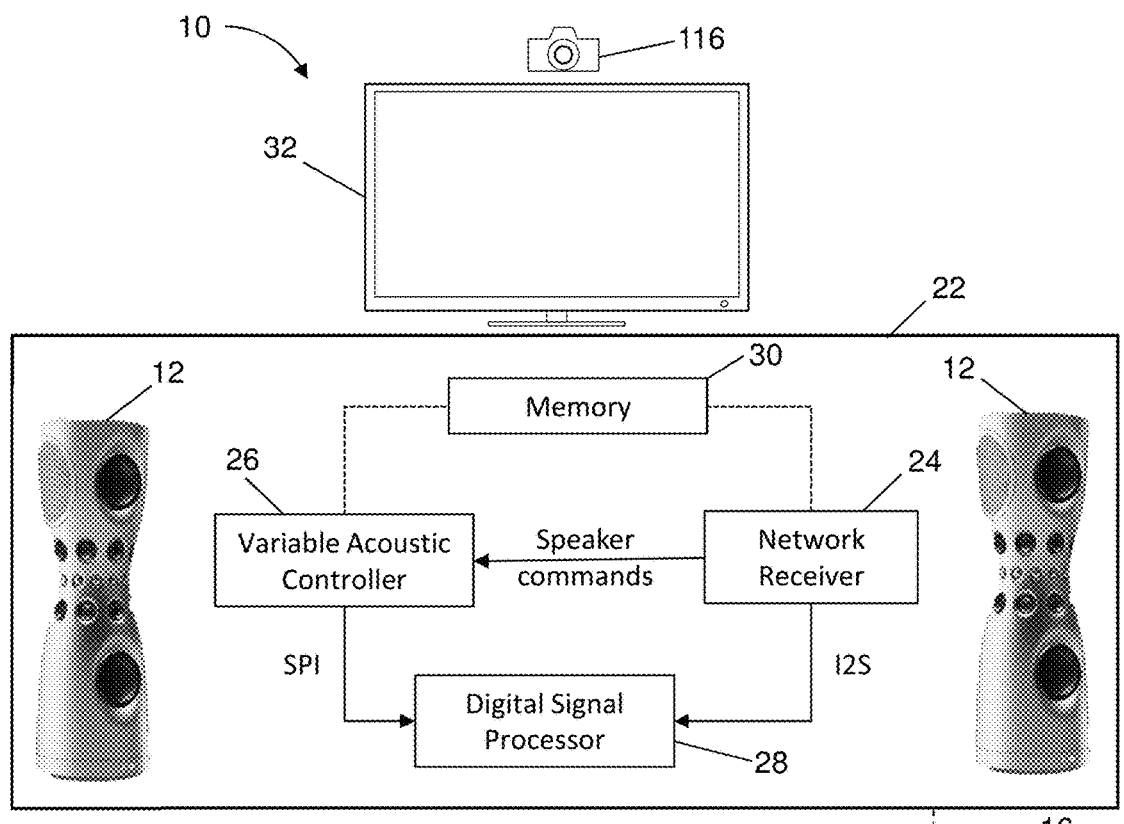
FIG. 1 illustrates an audio system having variable acoustic loudspeakers according to one embodiment.

FIG. 1 illustrates an audio system 10 according to one embodiment of the present application. The audio system 10 may be positioned in a residence, a business building or other suitable space. The audio system 10 includes variable acoustic loudspeakers 12 that use beamforming to direct acoustic energy in a preferred direction.

In the variable acoustic loudspeakers 12, beamforming is employed to provide a stereo, or multichannel, listening experience with a movable "sweet spot" by directing the left and right loudspeakers 12 to a relatively well-defined area in the listening room where the perceived separation is optimal. The operation that allows the sweet spot to be moved is beamforming.

Beamforming is accomplished by selectively filtering different audio frequencies. Digital signal processing is used in driving the variable acoustics loudspeaker 12 having an array of drivers. By applying different filters to the input channel, distinct output channels are generated and routed to different drivers in a cylindrical array on the variable acoustic loudspeakers 12, discussed in more detail below.

Each of the loudspeakers 12 concentrates its acoustic energy in a preferred direction, forming a beam. The beam can be steered in a selectable direction. By forming a beam of both the left and right loudspeakers and suitably directing the beams, the intersection of the left and right beams forms the sweet spot.

Digital beamforming filters may be implemented in conjunction with the loudspeaker array. For instance, by concentrating the acoustic energy in a preferred direction, a beam is formed. The beam can be steered in a selectable target direction or angle. By forming a beam of both the left and right channels and suitably directing the beams, the intersection of the two beams may form a sweet spot for imaging. In an example, different beam widths may be selected by the user, permitting different sweet-spot sizes. Thus, by using the array of drivers, the variable acoustic loudspeakers 12 may be designed to have a precisely-controllable directivity at vertical, horizontal and oblique angles that works in arbitrary rooms, and without room treatment.

The audio system 10 including variable acoustic loudspeakers 12 and control system 20 permit independent control of spatial directivity functions and their frequency dependency. As discussed in detail herein, the variable acoustic loudspeakers 12 may provide for an adjustable size of listening area with a focused sweet spot versus diffuse sound (party mode); natural sound of voices and musical instruments by adapting the correct directivity pattern; natural image of audio objects in a stereo panorama without distraction by unwanted room reflections; a full 360° spherical control of the sound field; an ability to create separate sound zones in a room by assigning different channels to different beams; multichannel playback with a single speaker (using side wall reflections); suppression of rear energy by at least 20 dB down to low frequencies without side lobes (e.g. within 40 Hz to 20 KHz); and a compact size, highly scalable beam control at wavelengths larger than the enclosure dimensions due to super-directive beamforming techniques.

The audio system includes a control system 20 that allows a user to move and control the sweet spot. The control system 20 generally includes any number of microprocessors, ASICs, ICs, memory (e.g., FLASH, ROM, RAM, EPROM and/or EEPROM) and software code to co-act with one another to perform a series of operations.

The control system 20 includes an application running on a mobile device 14 and the mobile device is in communication with a speaker controller 22. The speaker controller 22 is in communication with each variable acoustic loudspeaker 12 and may be integrated within each of the loudspeakers 12. The control system 20 also includes predetermined data, or "look up tables" that are based on calculations and test data and stored within the memory. The controller 22 communicates with other components of the system (e.g., the television 32, mobile device and/or a user interface etc.) over one or more wired or wireless connections using common bus protocols (e.g., CAN and LIN).

The mobile device 14 communicates remotely with the speaker controller 22 over a network 16. The network 16 may be a wired network, a wireless network or a combination of both.

The speaker controller 22 includes a network receiver 24, a variable acoustic controller 26 and a digital signal processing controller 28, as shown in FIG. 1. The speaker controller 22 may also include shared memory 30. The control system 20 may also receive audio and video inputs from devices including a television 32, for example.

The mobile device 14 includes the application graphic user interface (GUI) 36. This GUI 36 could be implemented on a mobile device 14 such as a mobile phone, a tablet, a laptop computer with display, or any suitable handheld device.

The audio system 10 is capable of producing five-channel stereo surround sound using only two loudspeakers 12 positioned at two locations in a room. Typical surround sound systems require four or more loudspeakers precisely positioned at different locations in the room to produce the same surround sound quality.

The audio system 10 is a fully active loudspeaker system that utilizes beam steering of each of the at least two beams from each loudspeaker 12 to achieve optimal sound distribution in any room environment giving the user full control to adapt the sound field to their unique lifestyle. Further, the audio system 10 allows optimal sound distribution without expensive acoustic treatment and with minimal equipment that does not require complicated installation in the listening room.

The user is not restricted to designing the living space around their audio system. Instead, the user can place the loudspeakers 12 wherever it is convenient and tailor the sound to the room layout. And, the expensive and obtrusive room acoustic treatment panels found in traditional high-end stereo systems are not required since the loudspeakers 12 control the beam pattern and eliminate the unwanted room reflections.

A complex and heavy rack of electronics with miles of cables are not required to drive the loudspeakers 12. The self-contained audio system 10 packs the loudspeakers, amplifiers, and digital signal processors into a compact form. The user only needs a mobile device or suitable user interface for control.

Each of the loudspeakers 12 may be positioned asymmetrically in the room while still being able to produce surround sound for any seating configuration. The two loudspeakers 12 may be positioned at any location relative to each other as long as the two loudspeakers 12 are angularly oriented parallel to each other. In one embodiment, the two loudspeakers 12 are positioned at least approximately four meters between each other and each loudspeaker 12 is positioned at least approximately one meter from a wall.

Figure 3:
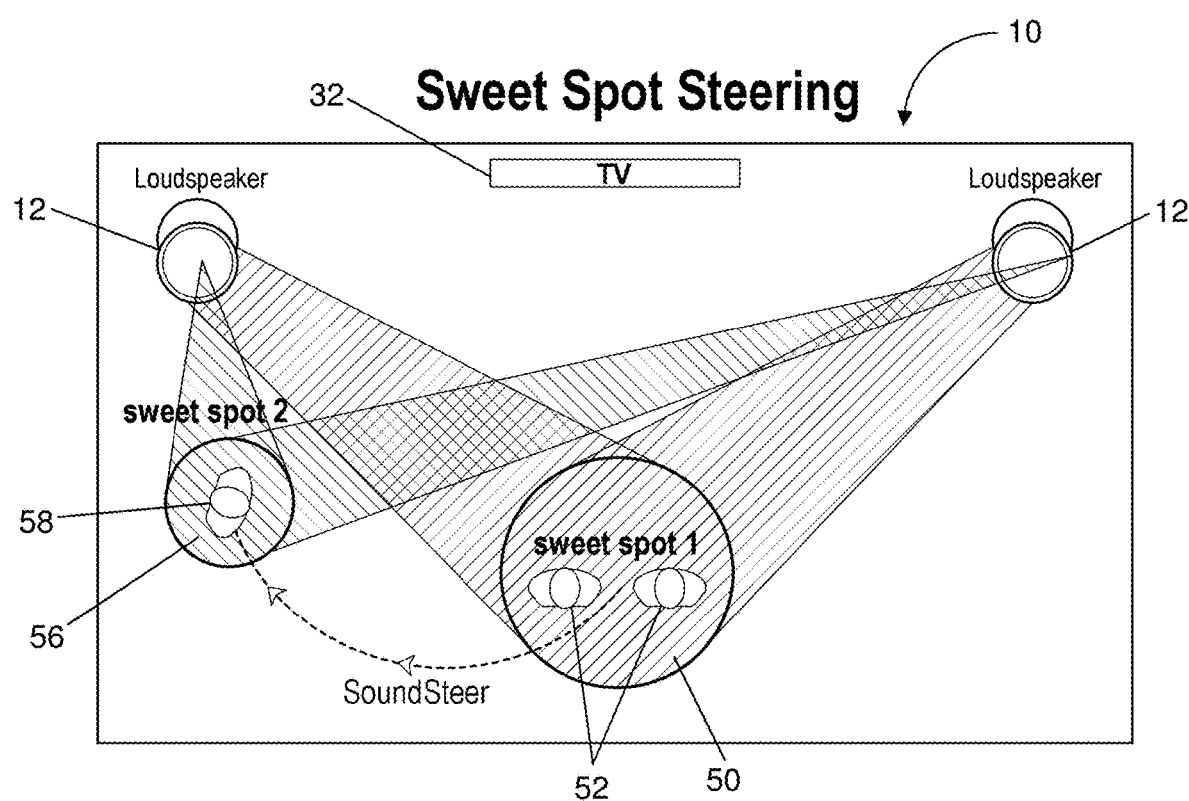
FIG. 3 illustrates the audio system of FIG. 1 for steering or controlling the location of the "sweet spot," according to one embodiment.

FIG. 3 illustrates the audio system 10 using loudspeakers 12 for steering or controlling the location of the "sweet spot." The audio system that uses digital signal processing (DSP) to steer the arrays of audio beams allows the user to select the location and size of their listening focused sweet spot, or locus of stereo surround sound where two beams intersect.

The loudspeaker 12 and variable acoustic radiation using DSP are described in U.S. Patent Application Ser. No. 62/382,212, filed Aug. 31, 2016, and International Application No. PCT/US2017/049543, filed Aug. 31, 2107, the disclosures of which are hereby incorporated in their entirety by reference herein. The pair of loudspeakers 12 combines state-of-the-art digital signal processing (DSP), loudspeaker design, and in-depth knowledge of room acoustics to deliver high-resolution loudspeakers that create a flexible, user-controllable hi-fidelity listening experience. The loudspeaker 12 is an all-in-one loudspeaker system controllable via the mobile device 14. The loudspeaker 12 is a fully active loudspeaker that utilizes beam steering to achieve optimal sound distribution in any room environment giving the user full control to adapt the sound field to their unique lifestyle.

The user can move and resize the sweet spot on a user interface 36. The sweet spot can be steered to move and focus the sound at a particular location in the room. Additionally, the size of the sweet spot can be adjusted. The interface 36 models the speaker arrangement in the listening area or room and allows a user to move and control the sweet spot. For example, a user may move the sweet spot using just a finger on the touch screen 38.

Figure 2:
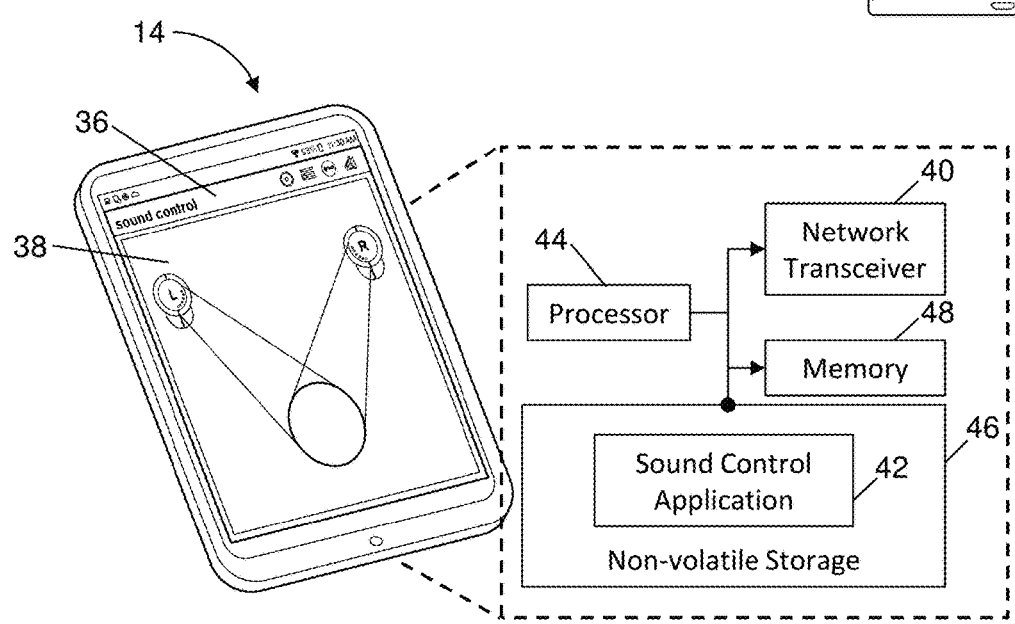
FIG. 2 illustrates a mobile device, according to one embodiment.

FIG. 2 illustrates a user device 14 and user interface 36 according to one embodiment. The user is able to move and resize the sweet spot with the touch of a finger along the user interface 36 of the mobile device 14. The sound sweet spot produced by the loudspeakers 12 moves in real-time as the user shifts the sweet-spot on the user interface. The loudspeakers 12 do not need to be repositioned or recalibrated.

As shown in FIG. 2, the mobile device 14 may include a transceiver 40, configured to communicate with the network receivers 24 in the speaker controller 22. The transceiver 40 may be configured to communicate wirelessly and may be a BLUETOOTH module, a ZIGBEE transceiver, a Wi-Fi transceiver, an IrDA transceiver, an RFID transceiver, etc. Additionally, or alternately, the mobile device 14 may communicate with any other devices and/or the speaker controller 22 over a wired connection, such as via a USB connection. The mobile device 14 may also include a global positioning system (GPS) module (not shown) configured to provide current location and time information to the mobile device 14.

The mobile device 14 may facilitate control of various processor functions via a sound control application 42. The application 42 may be downloadable to the mobile device 14 and may be used to control and interface with the processor 44. The application 42 may provide the interface 36 of the mobile device 14 with the GUI in order to present information to the user, as well as receive commands from the user. For example, the user may move the sweet spot using just a finger on the touch screen 38. The interface 36 is described in more detail below.

As illustrated in FIG. 2, the mobile device 14 having a processor 44 including a controller may be configured to perform instructions, commands and other routines in support of the operations described herein. Such instructions and other data may be maintained in a non-volatile manner using a variety of types of computer-readable storage medium 46. The computer-readable medium 46 (also referred to as a processor-readable medium or storage) includes any non-transitory medium (e.g., a tangible medium) that participates in providing instructions or other data to a memory 48 that may be read by the processor 44 of the mobile device 14. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The mobile device 14 may include the sound control application 42 stored on the storage 46. The application 42 may interface with the processor 44 to display various screens via the interface 36. These screens may facilitate moving, resizing and controlling the sweet-spot, as well as other audio control functions. The application may also include a player interface that can select music tracks for streaming over the network 16.

FIG. 3 illustrates control of a sweet-spot in a room using the audio system 10. For example, as shown in FIG. 3, a sweet spot 50 may be positioned in a first position adjusted to be larger to allow at least two listeners 52 to be within the sweet spot 50 and enjoy optimal acoustic sound that is stereo surround sound.

The sweet spot 56 may also be moved or steered to a second position and adjusted to be smaller and more focused at a different location for a narrow intimate focus for one listener 58, for example. The sweet spot may also be adjusted to be wider than sweet spots 50, 56 to provide omni-directional setting for a full saturated room sound. The "omni-directional" or diffuse sound may be a 270-degree sound beam. The diffuse beam fills most of the room with sound while still attenuating reflections off the rear wall of the room.

The loudspeaker 12 having sound beam steering utilizes DSP array processing to control the directivity via beam forming. This advanced algorithm adjusts the location and size of the "sweet spot" in real time so the user can optimize the listening experience to suit their individual needs. In at least one embodiment, high-resolution audio is delivered through up to thirty-two transducers (twelve tweeters, sixteen midrange, four woofers) over twenty-two channels of amplification delivering 1250 W of power. However, other numbers of transducers, over numbers of audio channels and other power outputs may be employed. For example, in another embodiment, thirty-four transducers, including a subwoofer, and twenty-four channels of audio may be used to deliver high resolution steerable audio. One embodiment of the transducer arrays of the loudspeakers 12 are discussed below. The audio system 10 and loudspeakers 12 are controlled by the user through the user interface 36 and the application 42 on the mobile device 14 in communication with the speaker controller 22, as discussed in more detail below.

Referring to FIGS. 4A-4M, exemplary screen shots of the sound control application 42 are presented via the interface 36. As explained, commands and information may be exchanged between the mobile device 14 and the speaker controller 22 via the network 16.

As shown in FIGS. 4A-4M, an example screen may include shortcut selectable options such as a setup button 60 and a sweet-spot sizing button 62, a stored preset button 64, and an input button 66, a mode-selection button 67, and a panorama control button 68. The setup button 60, upon selection, may display a screen similar to that of FIG. 4B and discussed below. The sweet-spot sizing button 62 may present a choice of sweet-spot sizes as shown in FIGS. 4D-4G. The stored-present button 64 may allow selection of preset information related to the sweet-spot size and sweet-spot location. For example, various presets may include information for various locations in a room where the user frequently listens to audio.

The input button 66 allows the user to select analog or digital input. The input button 66 may also allow the user to select or other input parameters. The input button 66 allows the user to select the number of sweet-spots, or select single-speaker mode, or dual-speaker mode, for example. The mode-selection button 67 allows the user to choose the number of sweet spots, or number of acoustic beams, as discussed in FIGS. 4J-4K. Other selectable option buttons may also be provided, such as a settings button or an information button, for example. The settings button may be selected to apply various user settings or menus, etc. The information button may provide general information and help information.

Figure 4A:
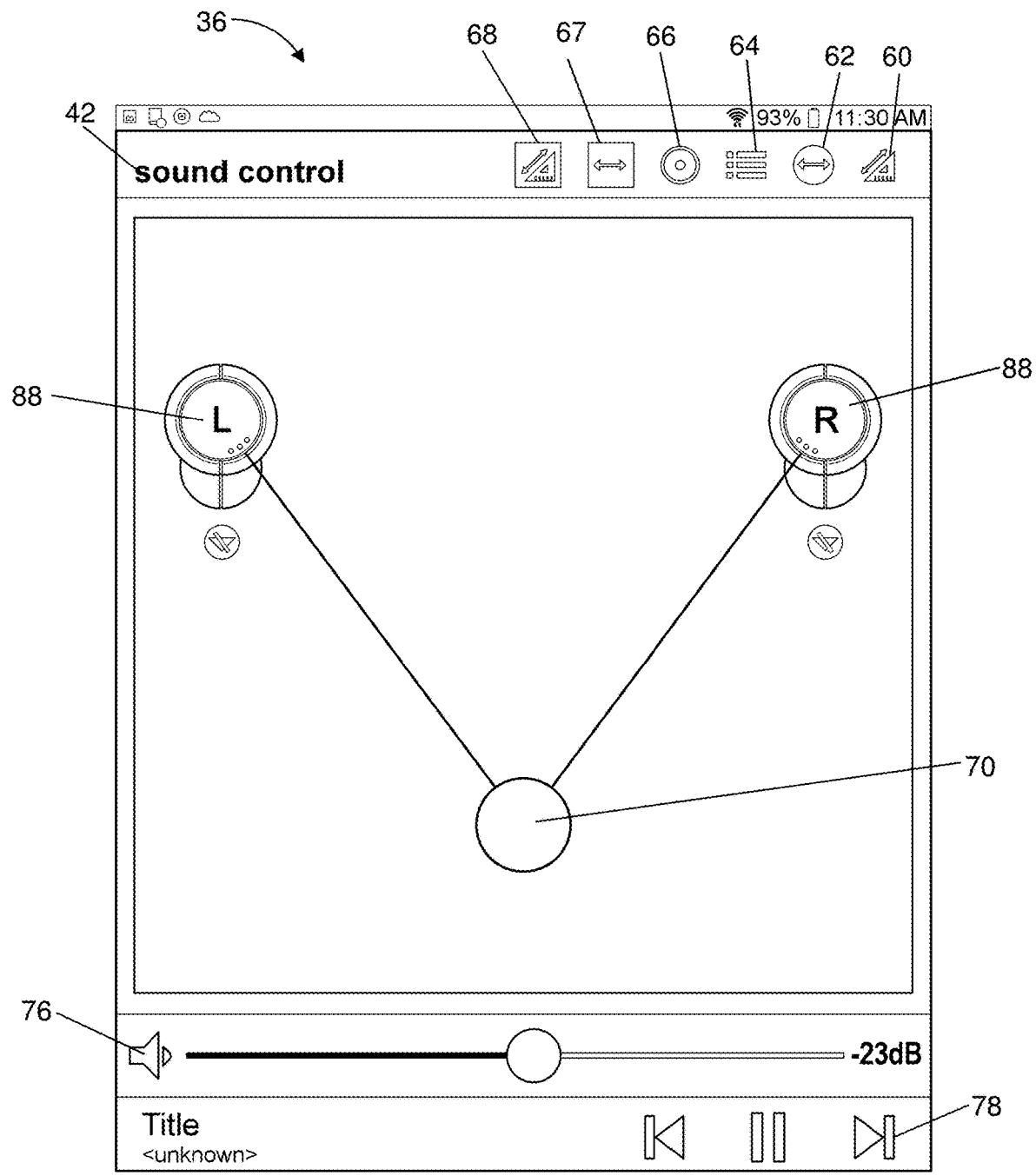
FIGS. 4A-4M illustrate example screens facilitated by a sound control application at the user device.

FIG. 4A illustrates the user interface 36 and an example of a sound steer screen of the sound control application 42. FIG. 4A may be the default view of the user interface 36 when the sound control application 42 is launched during typical use. In this view, the sweet-spot button 70 is centered and equidistant from both loudspeaker buttons 88. From this starting position, the sweet-spot button 70 may be dragged to another position as the user drags their finger across the interface 36 to change the sweet-spot location.

As shown in FIG. 4A, the application 42 may also include volume control 76 and audio player controls 78. As shown, the volume control 76 has a sliding button to increase or decrease the volume. The volume control 76 may also include a button to mute all audio sound. However, any volume control buttons may be used. The player controls 78 may include buttons displayed on the interface 36 that play, forward, reverse, or pause audio, for example. The sound control application 42 may include an integrated audio player application. The audio player application 42 may also be used to control and select the media input and playlist, for example.

When the sound control application 42 is launched for the first time, the application 42 may search for a speaker controller 22 and associated controllable loudspeakers 12. The application 42 may instruct the mobile device 14 to send a request to the speaker controller 22 via the network 16 which may in turn respond with controller information such as a controller ID, IP address, etc. Upon 'pairing' of the controller 22 and the mobile device 14, an interface may be created, allowing commands, responses and information to be transmitted and received between the devices.

Figure 4B:
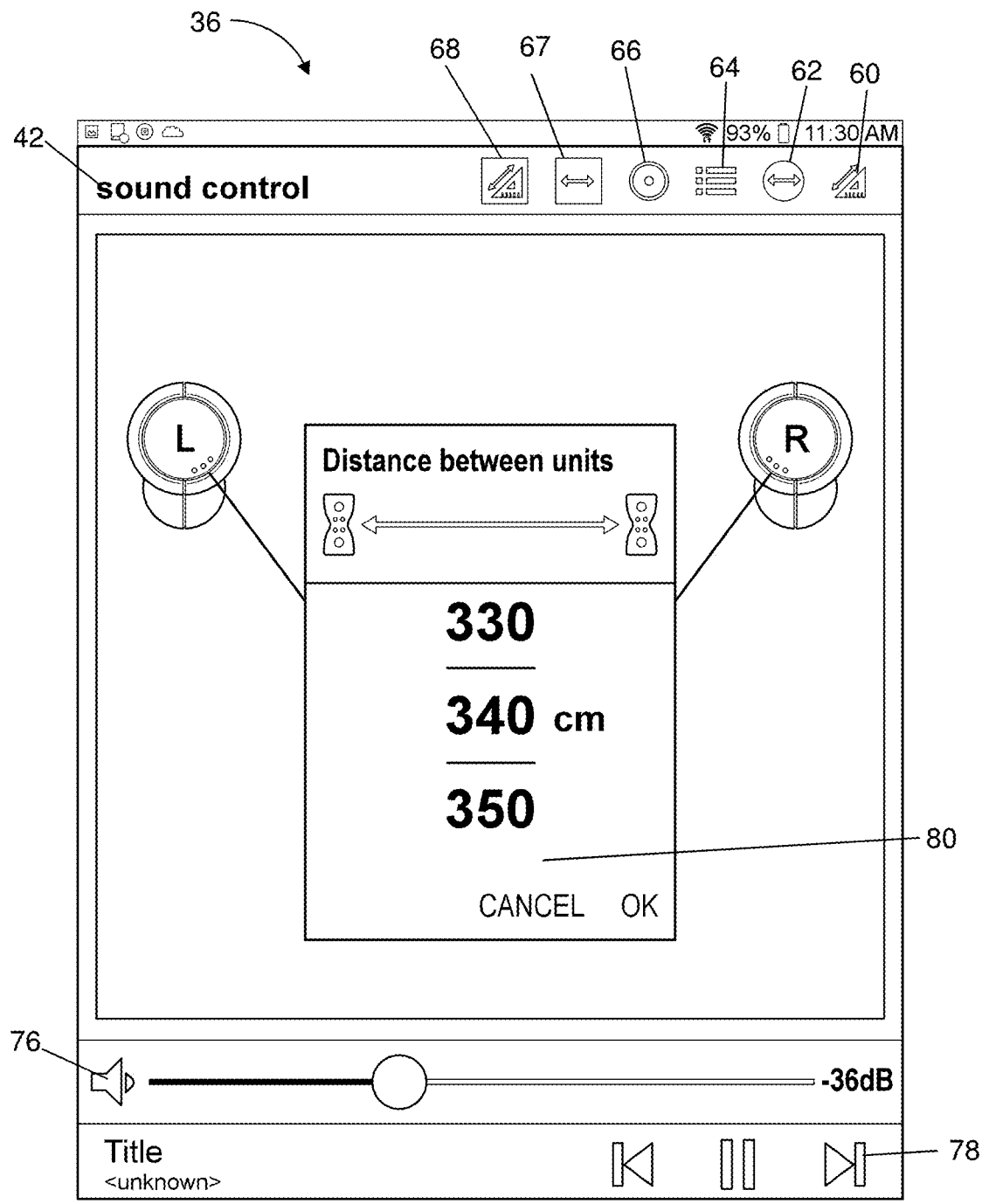

Once the mobile device 14 is paired with the speaker controller 22, the sound control application 42 may initiate a set up screen, as shown in FIG. 4B. FIG. 4B illustrates the user interface 36 setting or changing the distance between the loudspeaker buttons 86 in a room. The speakers are modeled on the interface 36 at a fixed distance, however, the two loudspeakers 12 may be positioned at any location relative to each other in the actual room. In order to properly model the listening area on the interface 36, the actual distance between the loudspeakers 12 is required to be entered by the user. As shown in FIG. 4B, the distance input 80 allows the user to scroll among distance dimensions. However, other distance input buttons or entry fields may be displayed on the interface 36 to receive the user's input of the distance between the loudspeakers 12.

The distance setup screen in FIG. 4B may also be selected at any time by selecting the setup button 60. For example, if the listener repositions the speakers in the room or changes the room the speakers are located in, the distance setup is required to have accurate control of the sweet spot. The distance set up screen may also receive additional inputs to properly model the listening area relative to the speakers. For example, the application 42 may request the distance of the loudspeakers 12 from the walls of the room. The volume and/or delay of each loudspeaker 12 may be controlled based on the desired location of the sweet spot relative to each loudspeaker 12.

Figure 4C:
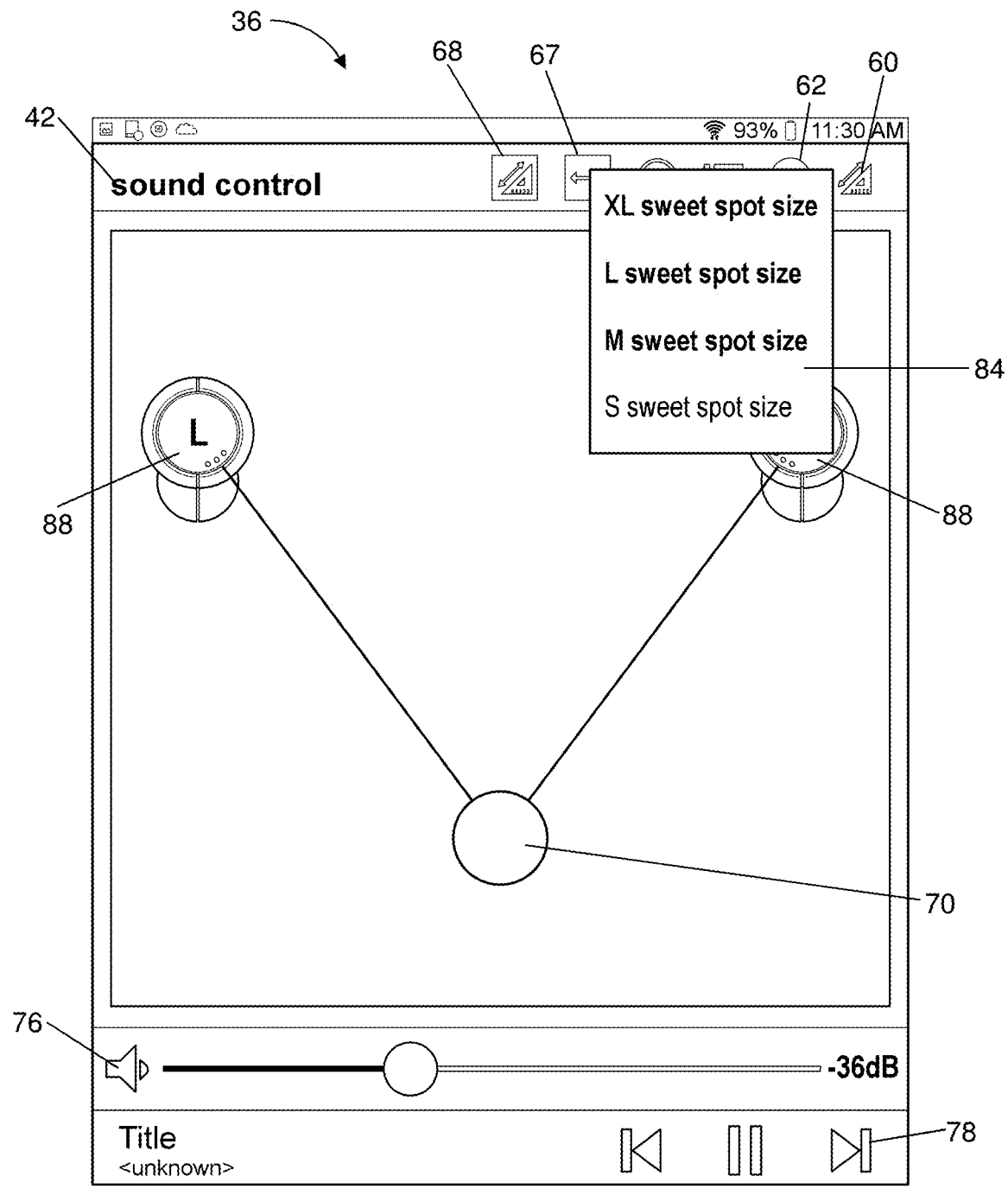

FIG. 4C illustrates the user interface 36 with a pop-up menu 84 for changing the size of the sweet spot. As shown in FIG. 4C, a medium sized sweet spot is selected on the menu 84. The menu pops up by selecting the sweet-spot sizing button 62. The menu 84 allows the user to select between four different sized sweet spots. The user may also pinch or swipe with two fingers to reduce or expand the size of the sweet spot. The sweet spot may have more than four different size choices, and may be infinitely variable in at least one embodiment.

Figure 4D:
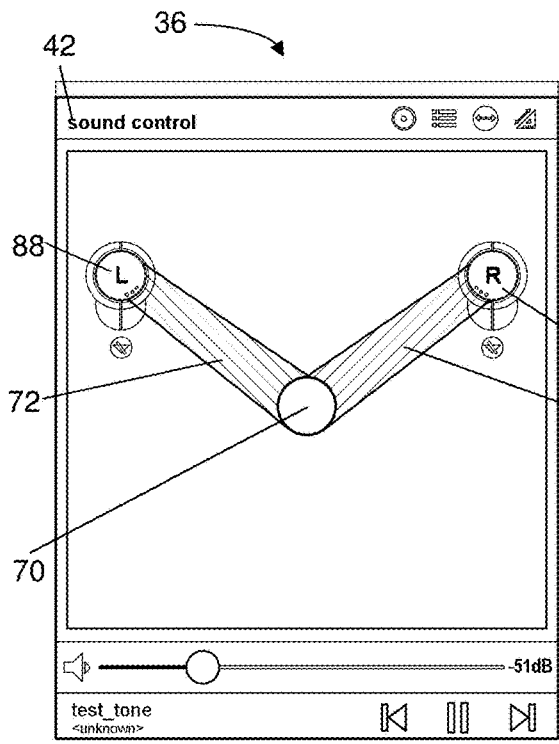
Figure 4E:
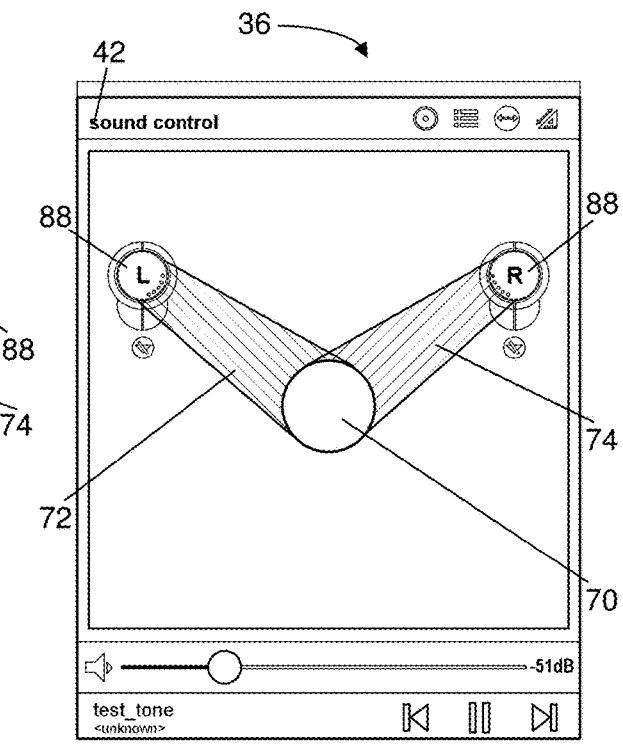
Figure 4F:
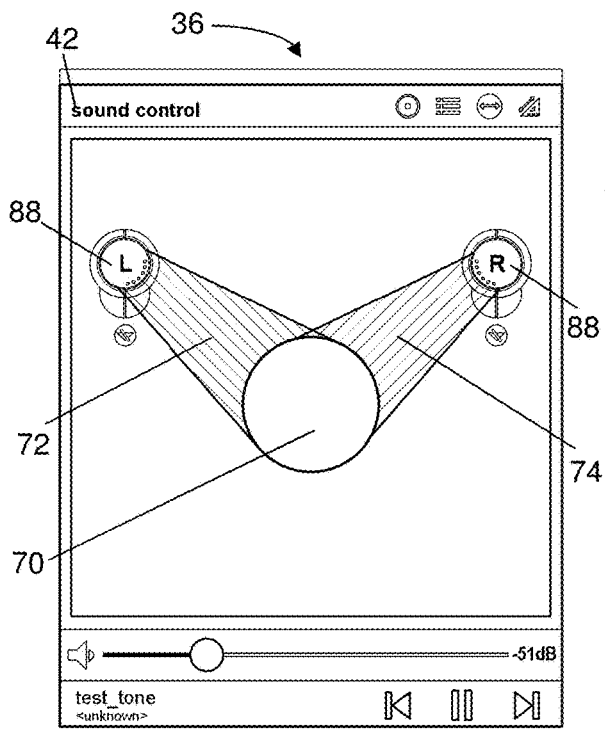

As shown in FIGS. 4D-4G, the interface 36 models the sweet-spot button 70 to correspond to the selected sweet-spot size. FIGS. 4D-4G illustrate the same sweet-spot location being generally the center of the sweet-spot button 70. The first steerable beam 72 and the second steerable beam 74 are projected at generally equal angles. But the sweet-spot size varies in FIGS. 4D-4G. For example, FIG. 4D illustrates a small sweet-spot button 70. FIG. 4E illustrates a medium sweet-spot button 70 being larger than the small sweet spot. FIG. 4F illustrates a large sized sweet spot being larger than the medium sweet spot. In addition to modeling the size of sweet-spot button 70 based on the selected sweet-spot size, the interface also models a beam width that corresponds to the size of the sweet spot. The width of the steerable beams 72,74 may be modeled as an angular width, as shown in FIGS. 4D-4F.

Figure 4G:
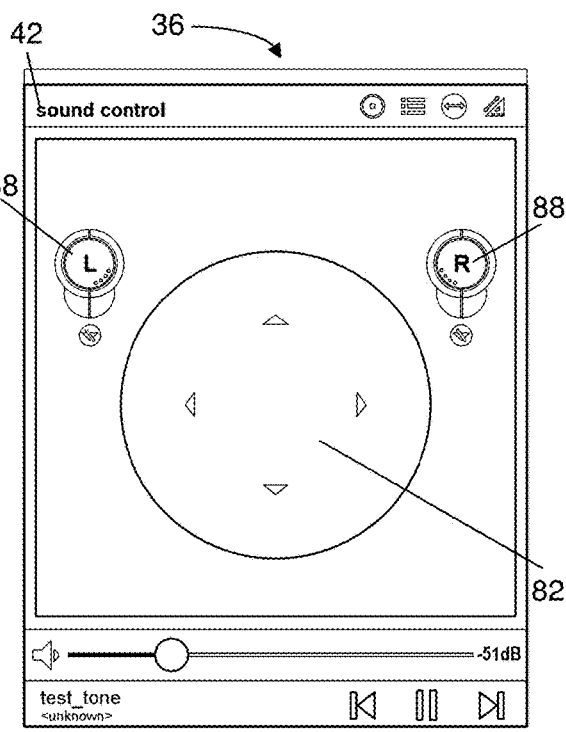

FIG. 4G illustrates an extra-large sized sweet spot 82, or alternatively, may illustrate omni-directional, or diffused sound. For extra-large, or omni-directional, or diffused beams, the beam direction indicators may not be shown and the omni-directional sweet spot 82 does not have a button that is steerable.

Figure 4H:
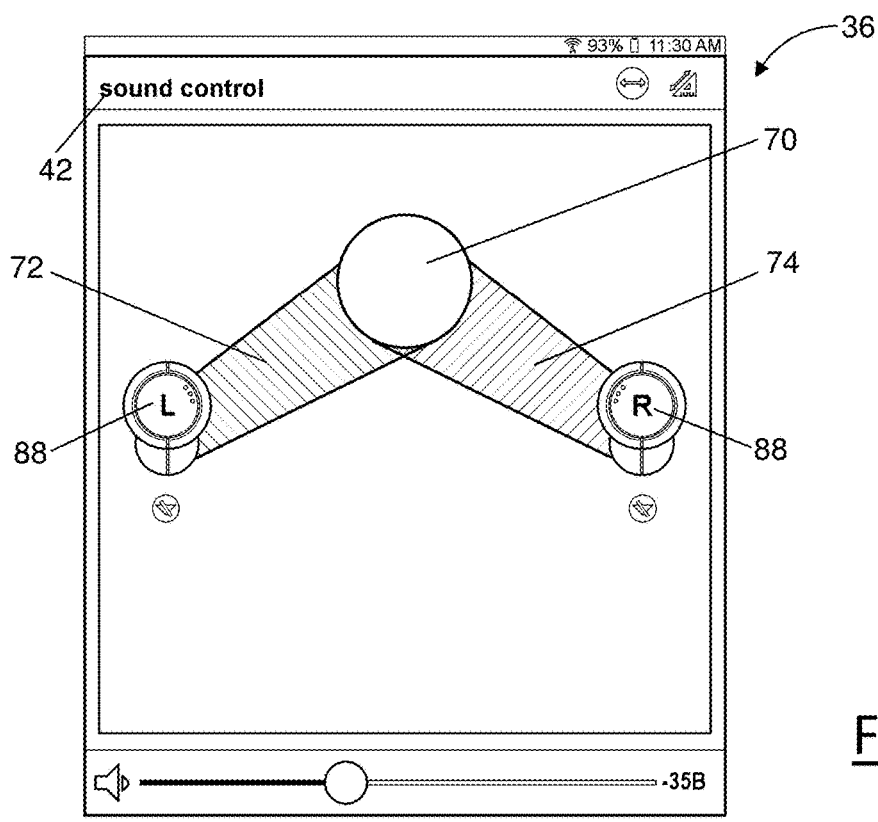
Figure 4I:
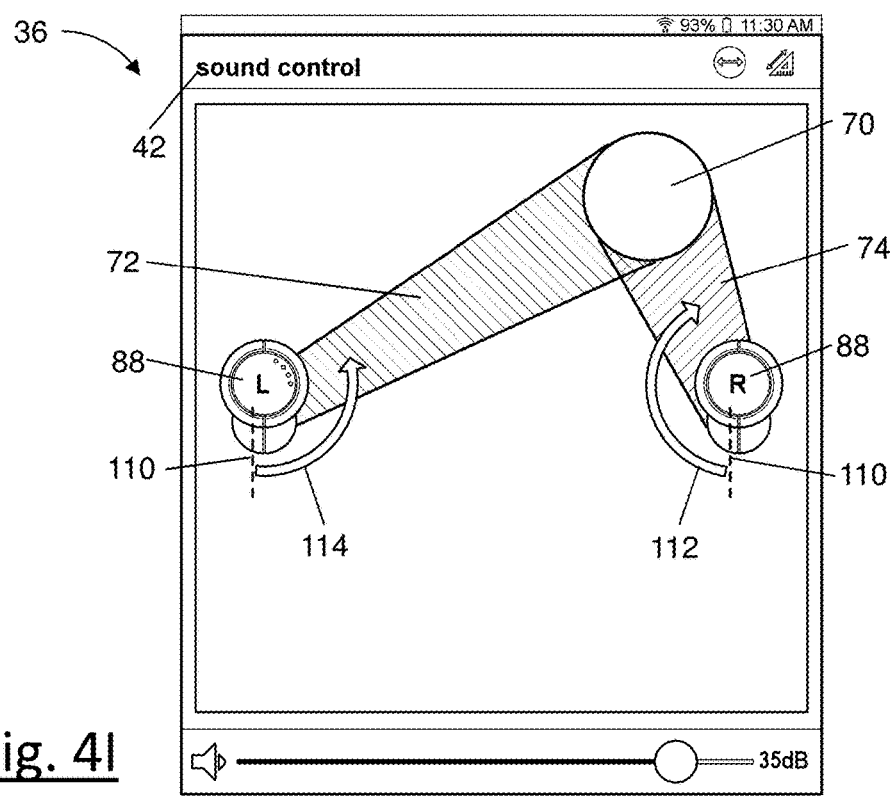

FIGS. 4H and 4I illustrate the user interface 36 controlling the loudspeakers 12 in dual speaker mode to steer and reposition the sweet spot using the sweet-spot button 70. In FIG. 4H the sweet-spot button 70 is located at a first location 90. In FIG. 4I, the sweet-spot button 70 is moved to a second location 92. The beam direction is also indicated by each of the modeled beam steerable beams 72, 74 from each speaker button 88. The beams 72, 74 may only be illustrated for small, medium or large sweet-spot sizes, but not for the omnidirectional, or extra-large beam size.

Figure 4J:
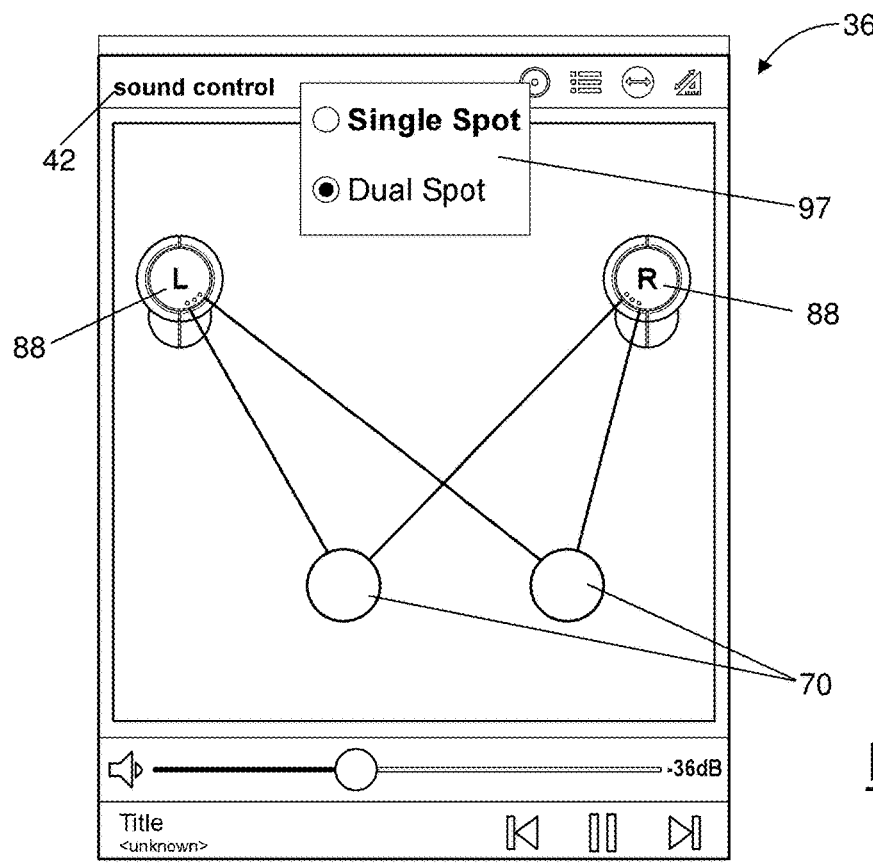

FIG. 4J illustrated the user interface 36 and different modes available in a sound steer screen of the sound control application 42. The mode-selection button 67 allows the user to choose the number of sweet spots, or number of acoustic beams, from a mode-selection drop-down menu 93, as shown in FIG. 4J. Selecting two sweet spots, or "dual spot" mode, two steerable beams are displayed from each loudspeaker button 88, as shown in FIG. 4J. Two sweet-spot buttons 70 are displayed, each being independently steerable to different positions on the user interface 36.

Figure 4K:
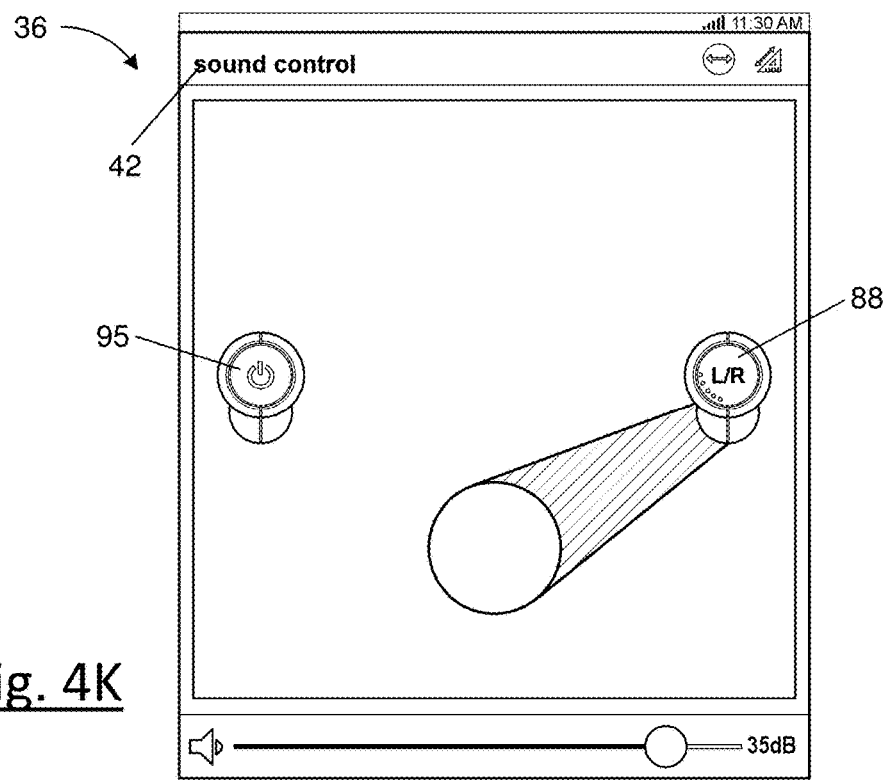

FIG. 4K illustrates the user interface 36 in a "single speaker" mode. In the single speaker mode, one variable acoustic loudspeaker 12 may be used to control both left and right channels of sound. The interface 36 may include a selectable power button 95 to allow the turning on or off one of the variable acoustic loudspeakers 12.

Figure 4L:
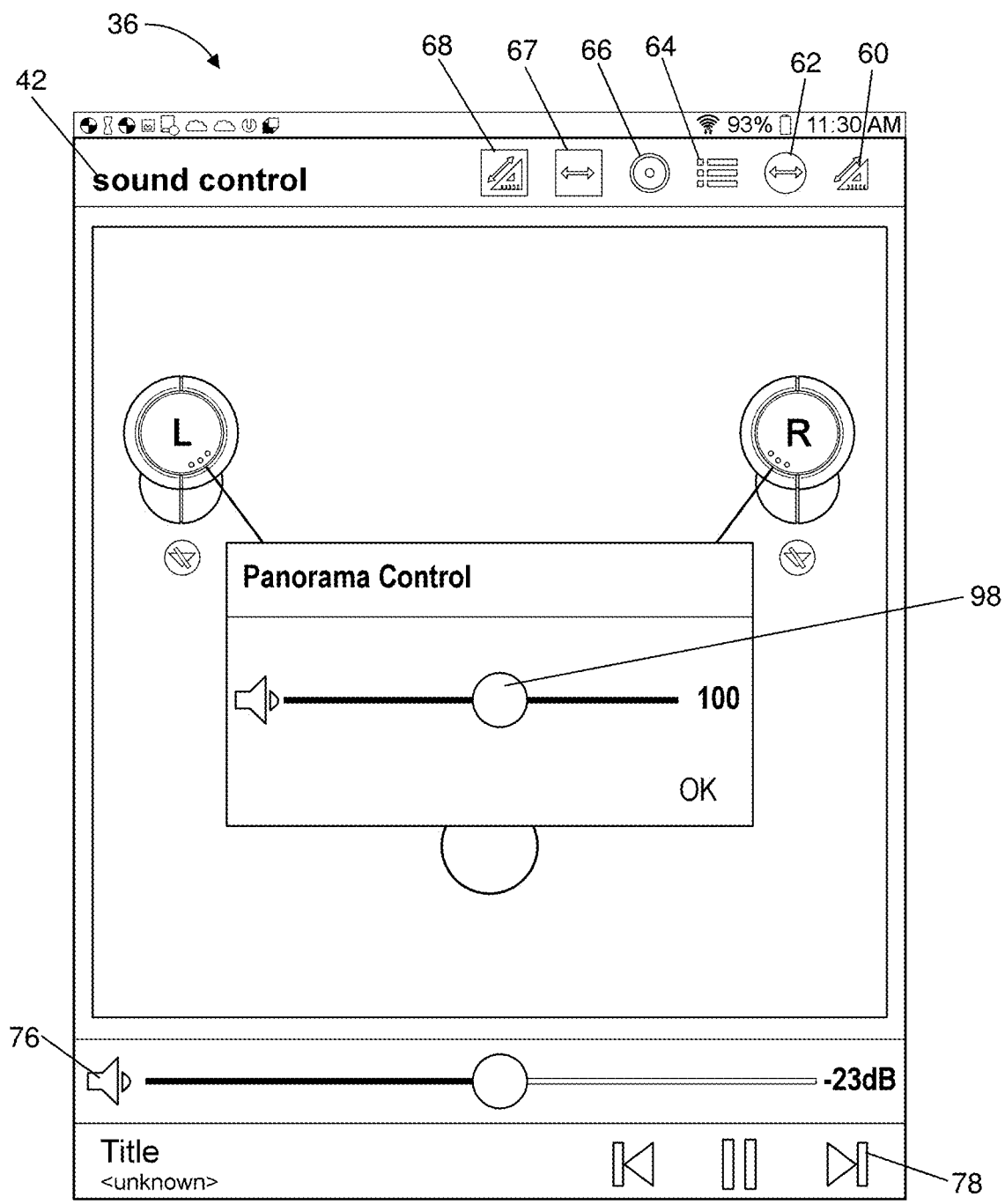

FIG. 4L illustrates a screen of the user interface 36 that allows panorama control. The panorama control slider 98 is displayed when the user selects that panorama setting button 67. Adjusting the panorama allows the listener to control the size of the virtual sound stage. If two variable acoustic loudspeakers 12 are positioned in a large room, they may be physically far apart in order to take advantage of the room size. In a small room, the units must necessarily be closer together. The problem that arises is that the stereo separation may not be appropriate for a given recording. For example, a recording made in a large concert venue would have many of the musicians far apart. A recording made in a more intimate setting would have the musicians close together. The panorama control allows the listener to adjust the size of the virtual soundstage as appropriate to the music.

The panorama control is implemented on a left or right loudspeaker 12 by adding or subtracting a portion of the opposite channel. The slider 98 is initially in the center. Moving the slider 98 to the left shrinks the virtual sound-stage, and moving the slider 98 to the right increases the virtual sound stage. Panorama control requires both left and right pure channels being supplied to both variable acoustic loudspeakers 12. New versions of left and right (L' and R') are generated and used in place of the original pure channels based on the position of the panorama slider 98.

Figure 4M:
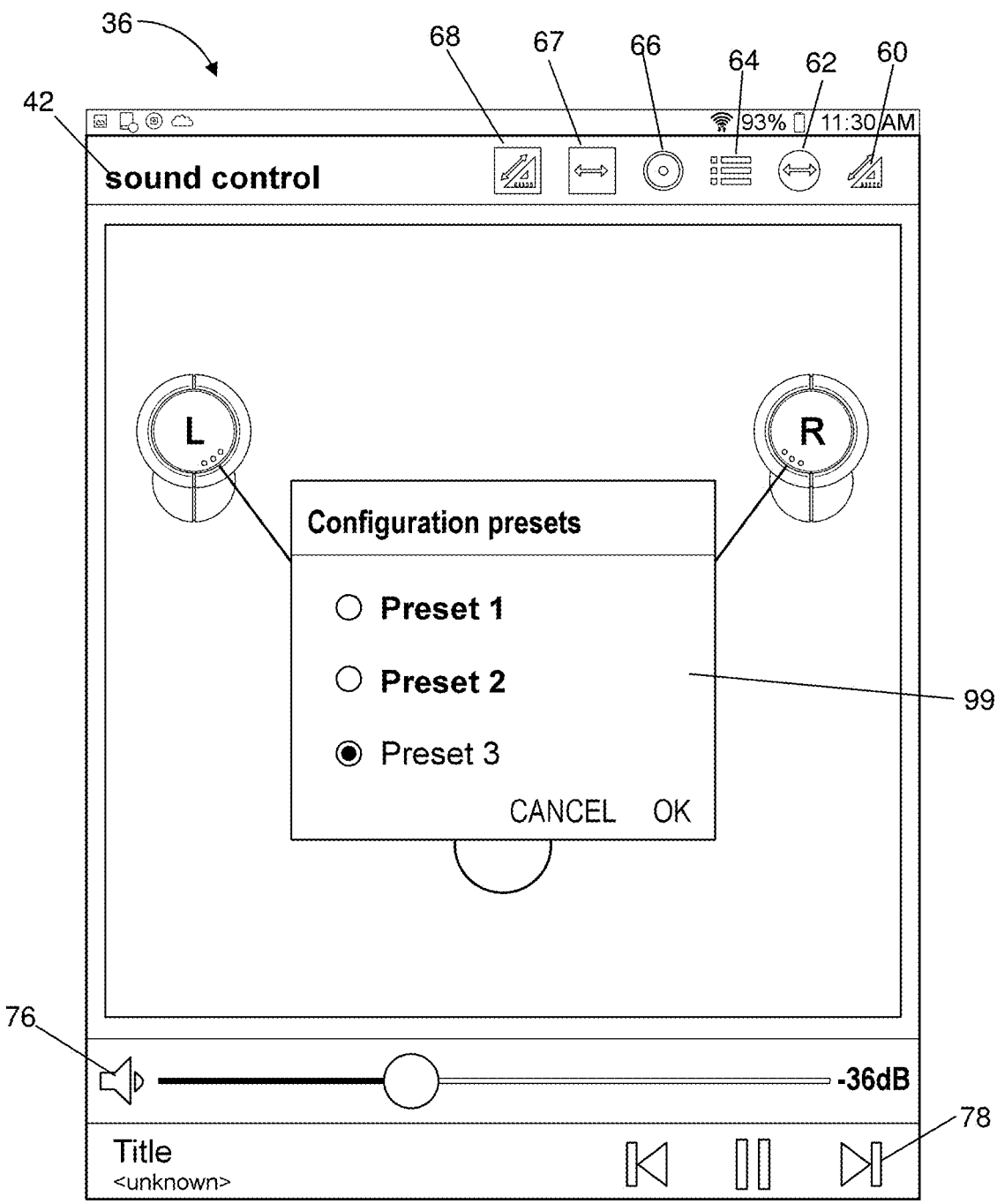

FIG. 4M illustrates selection of stored presets from a preset menu 99. The stored-present button 64 may allow selection of preset information related to the sweet-spot size and sweet-spot location. For example, various presets 1-3 on the preset menu 99 may include information for various locations in a room where the user frequently listens to audio. Each preset on the preset menu 99 may also include information about the number of sweet spot or desired sweet-spot size. The presets on the preset menu 99 may include additional audio preset information available in the audio control application 42.

Figure 5:
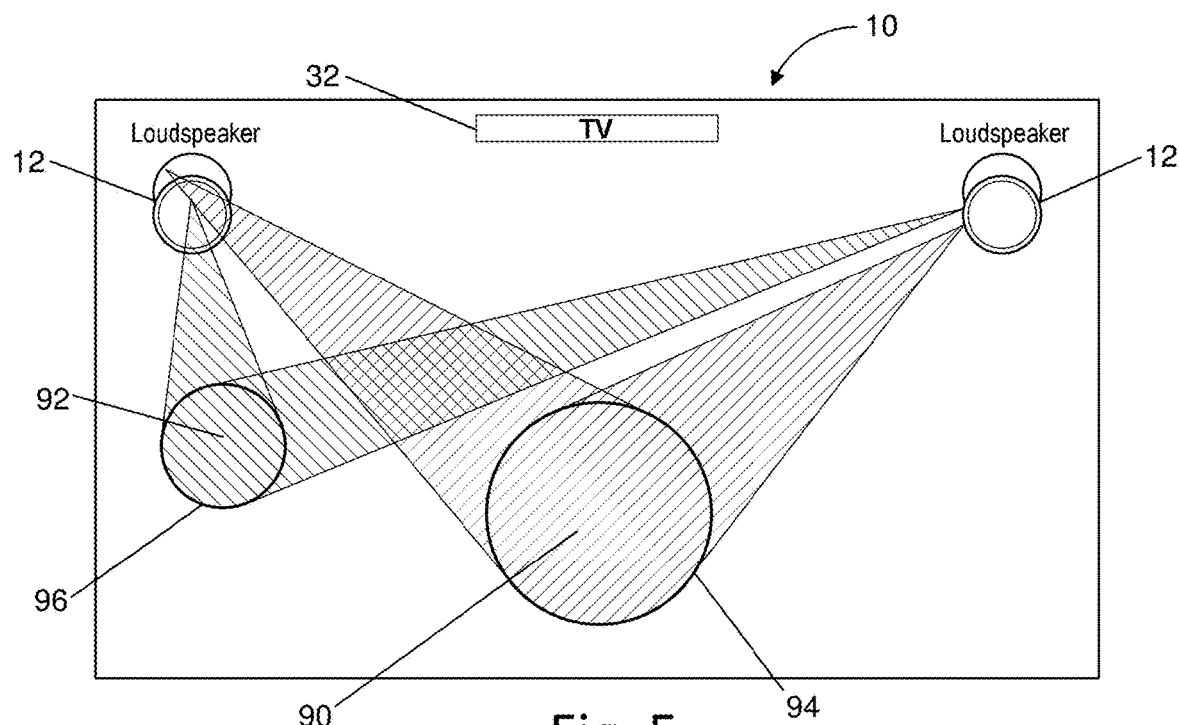
FIG. 5 illustrates the audio system of FIG. 1 controlling multiple sweet spots independently, according to one embodiment.

FIG. 5 illustrates the audio system controlling multiple sweet spots independently using the variable acoustic loudspeakers 12. In addition to controlling the location of the one sweet spot, the loudspeakers 12 may be controlled to produce multiple sweet spots independently at the same time. As shown in FIG. 5, the audio system 10 may control the loudspeakers 12 to produce a first sweet spot 94 centered at the first location 90 and a second sweet spot 96 centered at a second location 92 different than the first location 90. One sweet spot causes each loudspeaker 12 to output one channel of audio. In the "dual sweet spot" mode each loudspeaker 12 outputs two channels of audio.

The audio output to the first and second sweet spots 94, 96 may be controlled independently and simultaneously. Further, as shown in FIG. 5, each sweet spot 94, 96 may have a different size. Further, the volume of each sweet spot 94, 96 may be independently controlled independent of the size of the sweet spot.

Figure 6:
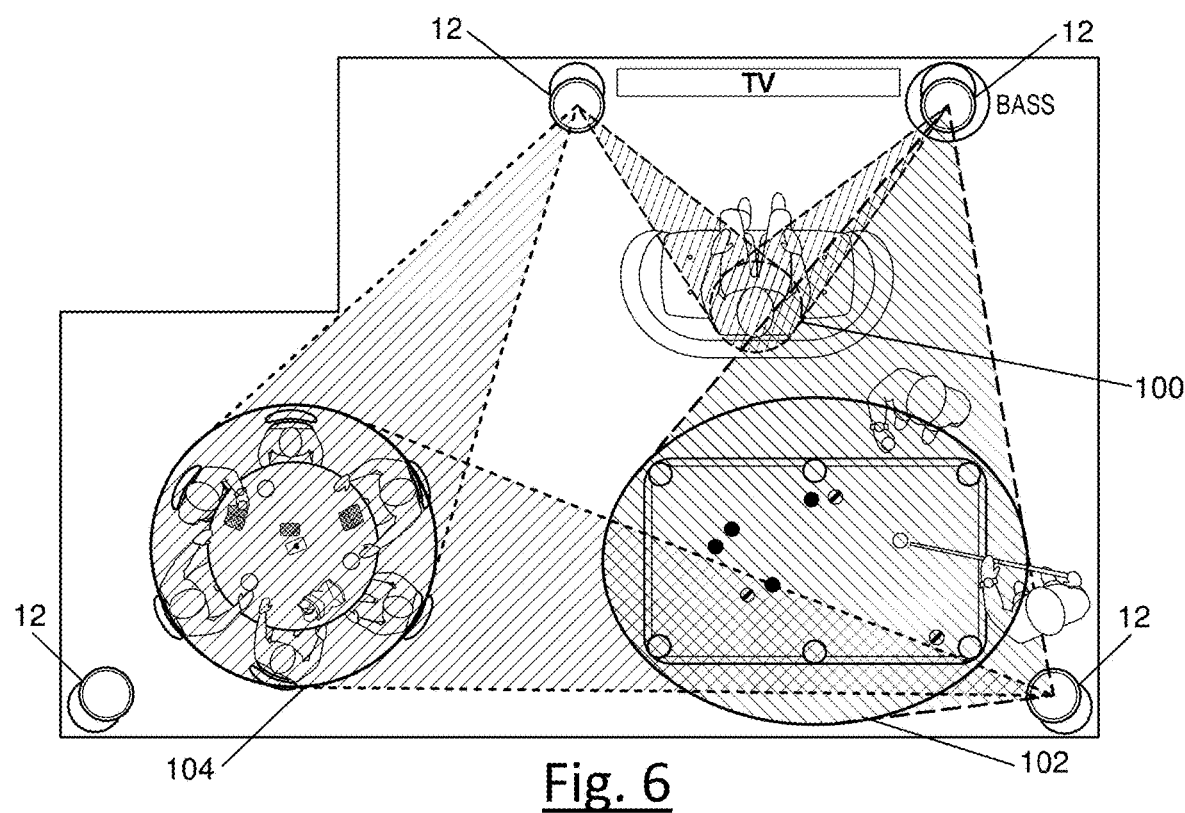
FIG. 6 illustrates the audio system of FIG. 1 controlling multiple sweet spots independently according to another embodiment.

FIG. 6 illustrates the audio system controlling multiple sweet spots independently and at the same time using loudspeakers 12. FIG. 6 illustrates a complex shaped media room having a plurality of variable acoustic loudspeakers 12. As shown in FIG. 6, the media room may have three to four loudspeakers 12. The media room may have a plurality of sweet spots. As shown in FIG. 6, the media room has three sweet spots 100, 102, 104 where each sweet spot is directed at a different seating location. Each sweet spot 100, 102, 104 may be formed from any two or more loudspeakers 12 to produce five channel stereo sound in a focused sweet spot.

Each of the sweet spots 100, 102, 104 may have a different size. Further, the volume of each sweet spot 100, 102, 104 may be independently controlled independent of the size of the sweet spot.

The size, position and number of sweet spots may also be controlled based on other inputs or devices. For example, as shown in FIG. 1, the audio system 10 may include a camera 116. The camera may be adapted to recognize listeners in the room. The camera 116 may be included in the television 32 or integrated in the loudspeakers 12 or be another suitable camera. The camera 116 may be able to recognize the number and position of listeners in the room. Based on the input from the camera 116, the audio system 10 may adjust the size and position of the sweet spot produced by the loudspeakers 12.

In another embodiment, the audio system 10 may be in communication with the individual user devices of a plurality of listeners and the audio system may receive position data of each of the listeners based on position data of the user devices. The audio system may adjust the size and position of the sweet spot produced by the loudspeaker 12 based on the sensed position of each user device. The audio system may receive position data from the user devices based on acoustic watermarks, such as acoustic signals hidden in the music, GPS data or other suitable positioning data to detect the listeners relative to the position of the loudspeakers 12.

Figure 7:
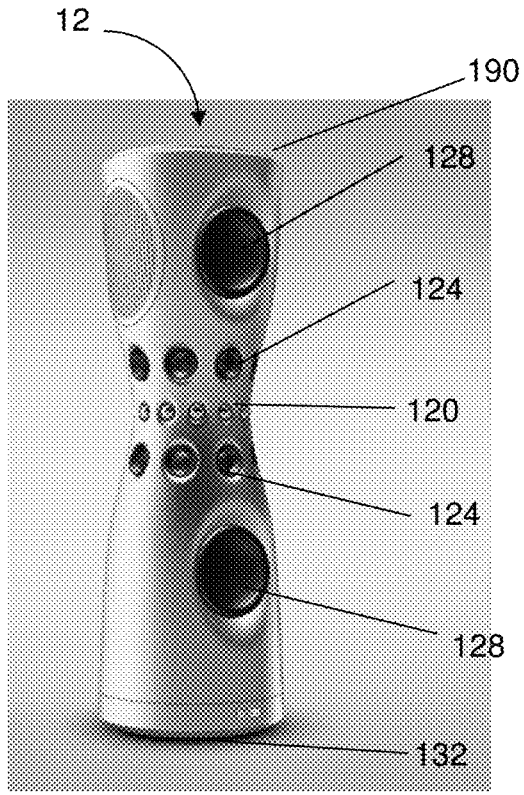
FIGS. 7-8 illustrate the variable acoustic loudspeakers in detail.

As shown in FIG. 7, the loudspeaker 12 is generally cylindrical with arrays of transducers uniformly distributed around the speaker body. The loudspeaker 12 has an overall shape being shaped like an hourglass having an upper section and a lower section, the upper and lower sections based on two oppositely oriented truncated cylinders, or truncated cones with their bases joined along a central section. The central section has at least one row of tweeters 120. As illustrated, the tweeter row may have twelve tweeters 120, or a suitable number of tweeters. The tweeters 120 are spaced evenly around the circumference of the central section.

The tweeter row is flanked by at least one pair of midrange rows of midrange transducers 124, one midrange row along the upper section and another midrange row along the lower section. As illustrated, each midrange row has eight midrange transducers. The midrange row may have six to eight midrange transducers, or any suitable number of transducers. The midrange transducers 124 are spaced evenly around the circumference of the upper and lower sections.

As shown in FIG. 7, the loudspeaker 12 may also include at least one pair of woofer rows of low-frequency woofers 128, one woofer row along the upper section and another woofer row along the lower section. Each woofer row may have two low-frequency transducers 128 spaced evenly around the circumference of the upper and lower sections and radiating to the front and rear respectively. In another embodiment, the loudspeaker 12 does not include low-frequency transducers and may have a more compact height being approximately two-feet high.

In another embodiment, the loudspeaker 12 may be a two-way version with eight full-range transducers in the center row, with two pairs of woofers. In this embodiment, there are no additional midrange transducers or tweeters.

Each section provides individual horizontal beam control in a dedicated frequency band. Vertical control is achieved by optimal crossover design and can be varied by choice of crossover frequencies.

The hourglass shape of the loudspeaker 12 is a design that complements any home decor. The sleek profile, small size and hourglass shape of the loudspeaker 12 also provides an optimized loudspeaker array designed to maximize the performance of the sound beam forming and steering. The loudspeakers 12 allow sound to be directed to where it is needed and directed away from where sound is not wanted. The loudspeakers 12 also allow projection of multiple beams using just one loudspeaker 12.

Figure 8:
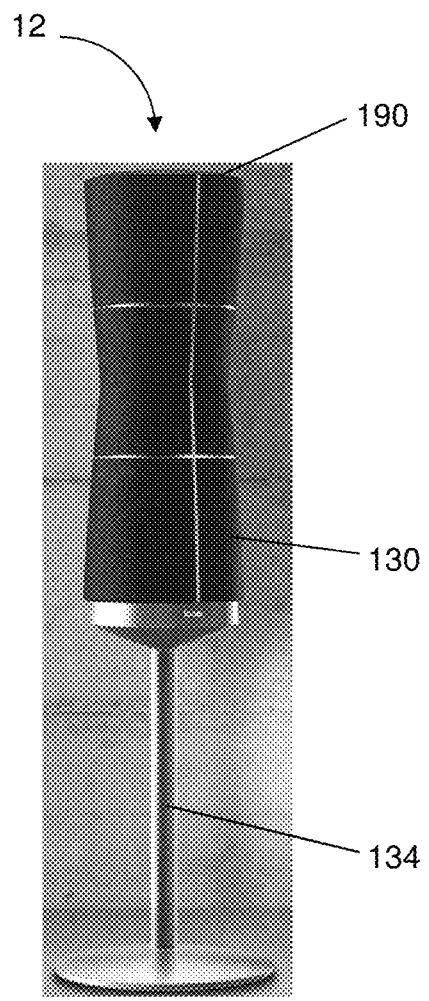

As shown in FIG. 8, the loudspeaker 12 may include a speaker grille 130 covering the transducers 120, 124, 128. The grille 130 may also have a generally hourglass shape. The grille 130 may be magnetically detachable and attachable to the loudspeaker 12.

The loudspeaker 12 in FIGS. 7 and 8 may have a generally planar base 132 or may be mounted on a speaker stand 134 to allow the loudspeaker to be positioned at any suitable location in a room.

The loudspeaker 12 may have audio inputs such as wireless Bluetooth with aptX, Wi-Fi (such as Chromecast, etc.), RCA or optical inputs. The loudspeaker 12 may have any suitable audio inputs known to a person of ordinary skill in the art. The loudspeaker 12 may also have video inputs such as HDMI or other suitable video inputs. The loudspeaker 12 may also be configured to connect to the internet using RJ45 Ethernet, for example, or any suitable internet connection.

The loudspeakers 12 may also include a light assembly 140. The light assembly 140 is designed to provide a visual indication of the approximate width and angle of the audio beam projected from the loudspeaker 12. As shown, alight ring 140 is positioned adjacent a top surface of the loudspeaker 12. The light assembly may also be positioned at an intermediate location between rows of transducers. The light ring 140 may be positioned along the periphery of the loudspeaker 12 and may be generally circular, however any suitable shaped light assembly may be used to provide a visual reference.

Figure 9:
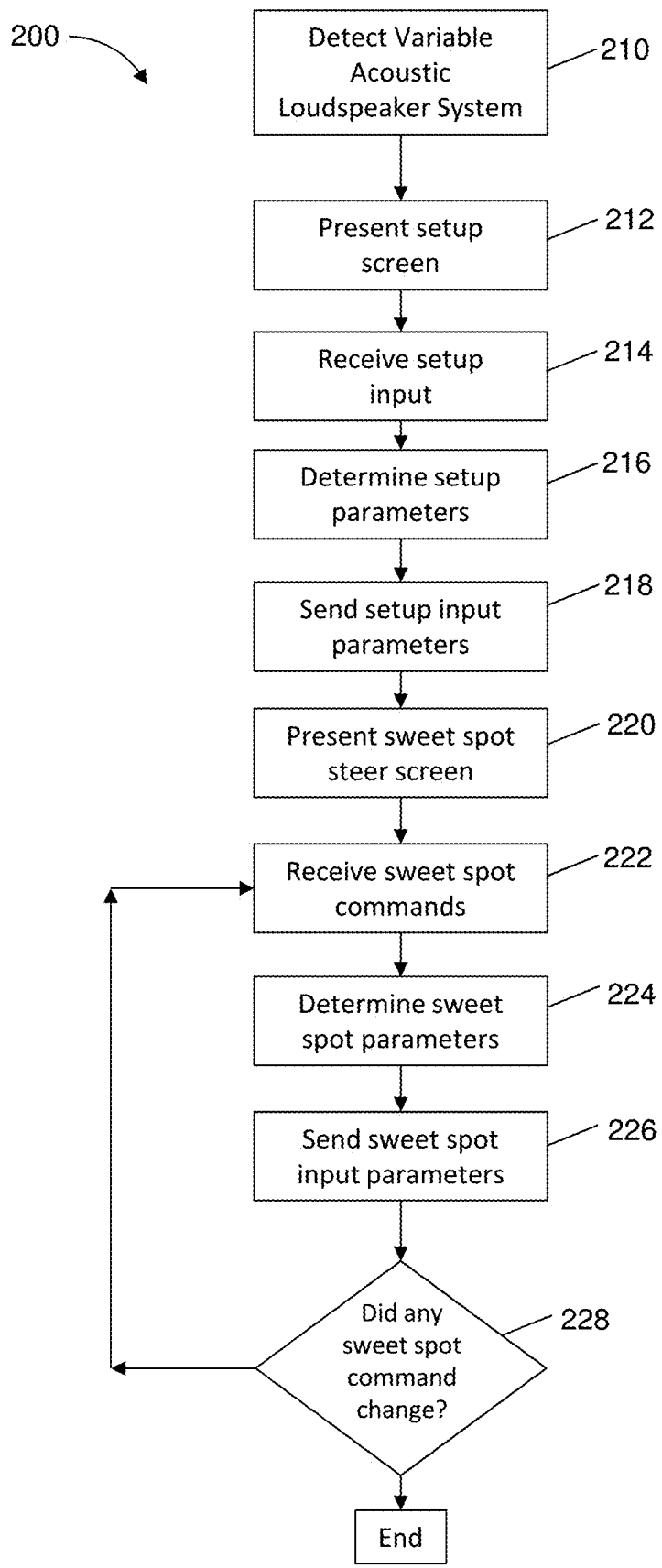
FIG. 9 is an example process of the mobile device.

FIG. 9 illustrates an example process 200 for the mobile device 14 of the audio system 10. The process 200 begins at block 210 where the processor 44 of the mobile device 14 may detect the variable acoustic loudspeakers 12 and the speaker controller 22. The controller within the processor 44 may be configured to perform instructions, commands, and other routines in support of controlling the loudspeakers 12.

At block 212, the controller may present a setup screen via the interface 110. The introductory screen may be similar to the screen illustrated in FIG. 4B.

At block 214, the controller may receive a setup input indicating the distance between the two loudspeakers 12. Other setup inputs may also be received by the controller via interface 36, such as the room dimensions, or wall locations relative to the loudspeakers 12, for example.

At block 216, the controller may determine the setup parameters based on the input received. For example, the controller may scale the screen area and pixels based on the input of the distance between the two loudspeakers 12.

At block 218, the controller, via the network transceiver 40, sends the setup parameters to the speaker controller 22.

At block 220, the controller may present a sweet-spot steer screen similar to the screen illustrated in FIG. 4A, for example.

At block 222, the controller may receive sweet-spot commands from the user via the interface 36. For example, the controller may receive commands indicating the sweet-spot location based on the selected position of the sweet-spot button 70. The controller may also receive commands indicating the desired sweet-spot size, such as in FIG. 4C.

At block 224, the controller may determine the sweet-spot parameters. For example, if the user drags the sweet-spot button 70 to a pixel or screen location, the controller may determine the actual physical location of the sweet spot in the room based on the scale of the screen.

At block 226, the controller, via the network transceiver 40, sends the sweet-spot parameters to the speaker controller 22.

At block 228, the controller determines if any sweet-spot commands changed. For example, the controller determines if the sweet-spot button 70 has been moved or dragged to a new location. The controller also determines if a new sweet-spot size has been selected.

Figure 10:
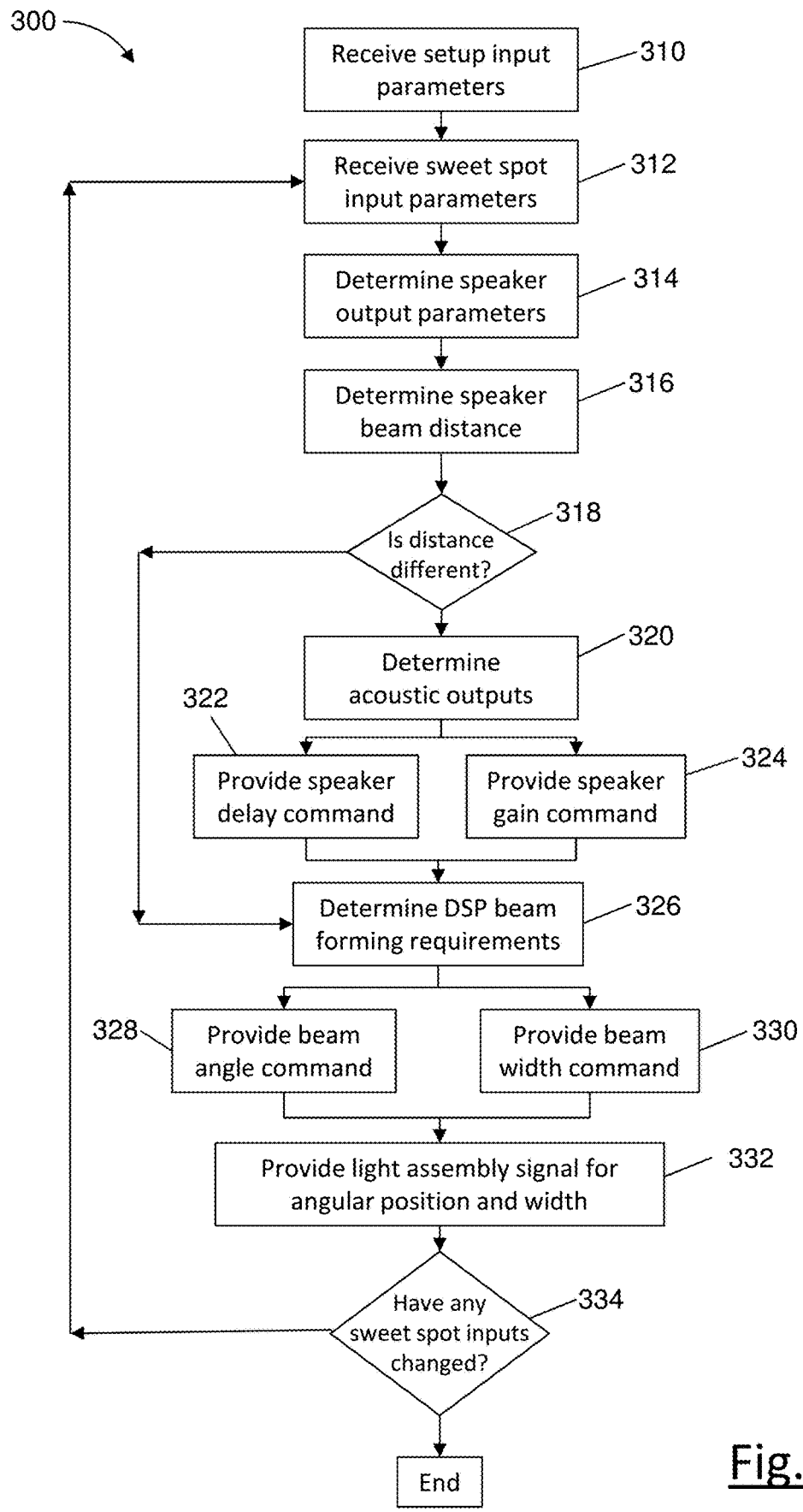
FIG. 10 is an example process of the audio system.

FIG. 10 illustrates an example process 300 for the audio system 10. The process 300 begins at block 310 where the controller 22 of the variable acoustic loudspeakers 12 receives setup input parameters via the network receiver 24 from the mobile device 14. The mobile device input may include a request to pair or create a connection with the controller 22.

At block 312, the controller receives sweet-spot parameters. The controller 22 may receive the sweet-spot parameters from the mobile device 14 via the network receiver 24. The controller 22 may receive requested sweet-spot parameters such as the sweet-spot location and sweet-spot size.

At block 314, the controller 22 determines the output parameters of the speaker in order to achieve the requested sweet-spot parameters. The speaker output parameters may include the beam angle, beam width, speaker delay and speaker gain.

At block 316, the controller may first determine the speaker beam angles and distance based on the sweet-spot location. The controller 22 determines the required beam distance of each steerable beam 72, 74 from each variable acoustic loudspeaker 12 so that the steerable beams 72, 74 intersect at the sweet spot.

The beam angle and beam distance may be different for each steerable beam 72, 74. At block 318, the controller determines if the beam distance is different for each steerable beam 72, 74.

At block 320, if the distance is different for each steerable beam 72, 74, the controller 26 determines the different required acoustic outputs for each variable acoustic speaker 12. At block 322, the controller 26 may provide different speaker delay output commands for each of the loudspeakers 12. For a beam with a shorter distance, a delay is introduced to ensure the sound arrives at the sweet spot at the same time as the beam with the longer distance. For example, in the example in FIG. 4I, the right steerable beam 74 has a shorter distance to the sweet-spot location 92 than the left steerable beam 72. Therefore, the controller 26 may introduce a delay from the right loudspeaker 12 to ensure the right steerable beam 74 arrives at the sweet-spot location 92 at the same time as the left steerable beam 72.

At block 324, if the distance is different for each steerable beam 72, 74, the controller 26 provides different speaker gain output commands to each of the loudspeakers 12. The gain for each loudspeaker 12 may be adjusted to ensure the volume is the same from each loudspeaker 12 at the sweet-spot location. Gain may be adjusted based on an inverse relationship to distance. Again, using the example in FIG. 4I, the right steerable beam 74 has a distance that is approximately half as far to the sweet-spot location 92 than steerable beam 72. Therefore, the controller 26 may reduce the gain in the right loudspeaker 12 by 6 dB to ensure the volume from the right steerable beam 74 at the sweet-spot location 92 is the same as the volume from the left steerable beam 72 at the sweet-spot location 92.

At block 326, the controller 22 determines the required DSP beam forming requirements based on the sweet-spot location and desired sweet-spot size. The digital signal processor 28 provides the signal processing for beamforming. The processor 28 digital audio input consists of left and right stereo channels, and outputs twenty-two channels based on various filtering and mixing operations to direct the beams.

Beamforming is accomplished by selectively filtering different audio frequencies. For the purpose of beamforming, three input bands are handled separately: high-frequency, mid-range and bass. The high-frequencies are output in twelve channels to the tweeters 120; the mid-range frequencies are output in eight channels to the mid-range drivers 124; and the bass frequency is output in two channels to the bass drivers 128.

At block 328, the digital signal processor 28 provides a beam angle command to each of the variable acoustic loudspeakers 12 to form the steerable beams 72, 74 in a required direction based the sweet-spot location. The angle from each of the left and right loudspeakers 12 may be different. The angle may be measured from a vertical axis 110 as shown in the speaker button 88. In the example in FIG. 4I, steerable beam 74 may be a positive angle in the clockwise direction 112. Steerable beam 72 may be a negative angle in the counter-clockwise direction 114.

At block 330, the digital signal processor 28 provides a beam width command to each of the variable acoustic loudspeakers 12 to form steerable beams 72, 74 at a required width based on the selected sweet-spot size. In general, the beam width for each of the steerable beams 72, 74 will be generally equal.

At block 332, the controller provides the light assembly 140 with a signal for the angular position and width of the illuminated portion. The angular position may be based on the audio beam angle and the width light portion is based on the audio beam width of each of the variable acoustic loudspeakers 12. The angular positions of the illuminated portion for each loudspeaker may be different based on the relative position of the sweet spot. However, the width of the illuminated portion for each of the loudspeaker 12 will be generally equal.

At block 334, the controller 22 determines if any sweet-spot inputs have changed. The steerable audio beams 72, 74 can be easily changed at will and the beam can be steered quickly and accurately. For example, the sweet spot and corresponding steerable audio beams can be changed in 50-75 milliseconds.

Figure 11:
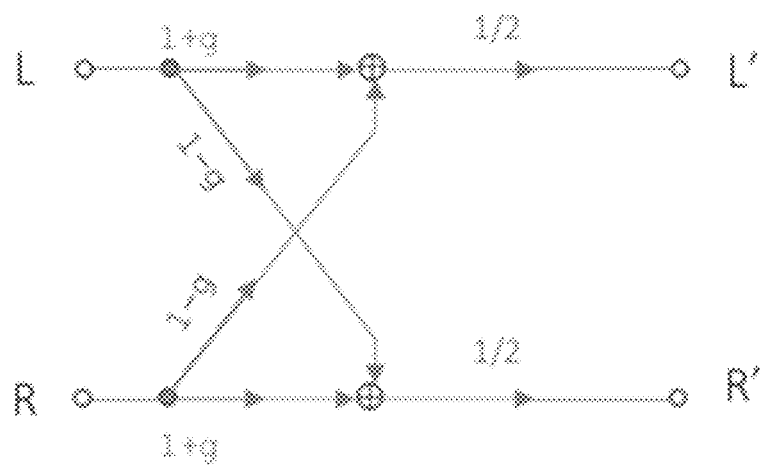
FIG. 11 is a schematic diagram of a control process of the audio system.

The controller 22 may also receive requests for panorama control. As shown in FIG. 11, the controller 22 may provide panorama control which is implemented on a left or right loudspeaker 12 by adding or subtracting a portion the opposite channel. The controller provides panorama control is implemented on a left or right loudspeaker 12 by adding or subtracting a portion of the opposite channel. A single gain parameter is provided to both left and right loudspeakers 12. This gain values varies according to a slider, from 0 to 2.0. The slider is initially in the center, at a gain equivalent to 1.0. Moving the slider to the left lowers the gain toward 0.0, moving to the right raises the gain to a max of 2.0. Lowering the gain shrinks the virtual soundstage, raising the gain increases the virtual soundstage. This gain (g) is the mixing parameter described in the equations and schematic diagram of FIG. 11. New versions of left and right (L' and R') are generated and used in place of the original pure channels.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An audio system comprising:
   a first speaker assembly having a first steerable audio beam;
   a second speaker assembly having a second steerable audio beam, wherein an intersection of the first and second steerable audio beams defines a sweet-spot area having surround sound;

a control system in communication with the first and
second speaker assemblies and programmed to:
receive a manual input from a user of a desired sweet-spot location having surround sound;
command the first and second speaker assemblies to adjust at least one parameter of the first and second steerable audio beams so that the second steerable audio beam intersects the first steerable audio beam to form the sweet-spot area at the sweet-spot location.

2. The audio system of claim 1, wherein the at least one parameter includes at least one of a beam angle, a beam width, a delay and gain.

3. The audio system of claim 1, wherein the control system is further programmed to:
receive a setup signal indicating a separation distance between the first and second speaker assemblies;
calculate a beam angle and a beam distance each of the first and second steerable audio beams based on the separation distance and the sweet-spot location;
provide a digital signal processing (DSP) command to the first and second speakers to adjust the beam angle;
command the first and second speaker assemblies to adjust a speaker delay and speaker a gain based on the beam distance of each of the first and second steerable audio beams.

4. The audio system of claim 3, wherein the speaker gain is adjusted inverse to a distance difference between first and second beam distances.

5. The audio system of claim 3 wherein the control system has a digital signal processing (DSP) controller programmed to:
receive the beam angle; and
adjust the beam angle of each of the first and second steerable audio beams.

6. The audio system of claim 5 wherein the DSP controller is further programmed to:
receive a sweet-spot size;
adjust a beam width of each of the first and second steerable audio beams.

7. The audio system of claim 1, wherein the control system is further programmed to:
receive the manual input signal via a user interface from a mobile device remote from the first and second speaker assemblies and control system.

8. The audio system of claim 1, wherein the first and second loudspeaker assemblies comprise:
an array of a plurality of tweeters;
an array of a plurality of mid-range transducers; and
at least one woofer.

9. The audio system of claim 8, wherein the array of the plurality of tweeters is arranged in a first circular pattern, and wherein
the array of the plurality of mid-range transducers is arranged is a second circular pattern spaced vertically and generally parallel to the first circular pattern.

10. A method of controlling an audio system comprising:
receiving a sweet-spot input signal indicative of a sweet-spot area having surround sound;
providing an output signal to adjust first and second steerable audio beams;
adjusting the first and second steerable beams so that the second steerable audio beam intersects the first steerable audio beam to form the sweet-spot area having surround sound at the intersection.

11. The method of claim 10, wherein adjusting the first and second steerable audio beams includes adjusting at least one of a beam angle, a beam width, a delay and gain.

12. The method of claim 10, further comprising:
receiving a sweet-spot location based on a manual input from user on a mobile device remote from each of a first speaker assembly and a second speaker assembly;
determining a beam angle of each of the first steerable audio beam from a first speaker assembly and the second steerable audio beam from a second speaker assembly based on the sweet-spot location;
providing a digital signal processing (DSP) command to the first and second speaker assemblies to adjust the beam angle of each of the first and second steerable audio beams.

13. The method of claim 12, further comprising:
determining a beam distance of each of the first and second steerable audio beams from the first speaker assembly and the second steerable audio beam from the second speaker assembly;
providing a signal to adjust the speaker delay and speaker gain based on the beam distance of each of the first and second steerable audio beams.

14. The method of claim 12, further comprising:
receiving a size input of the sweet-spot area;
providing a digital signal processing (DSP) command to the first and second speaker assemblies to adjust a beam width of each of the first and second steerable audio beams based on the size input.

15. The method of claim 10, further comprising:
receiving an input to move the sweet-spot location from a first location to a second location;
providing a beam-steering command to move the first and second steerable audio beams.

16. A non-transitory computer-readable medium tangibly embodying computer-executable instructions of a software program, the software program being executable by a processor of a computing device to provide operations, comprising:
providing a first signal to a form a first steerable audio beam from the first speaker assembly;
providing a second signal to a form a second steerable audio beam from the second speaker assembly, wherein an intersection of the first and second steerable audio beams defines a sweet-spot area having surround sound;
receiving a manual input of a desired sweet-spot location from a device remote from the first and second speaker assemblies; and
adjusting output parameters of the first and second steerable audio beams so the second steerable audio beam intersects the first steerable audio beam to form the sweet-spot area having surround sound at the desired sweet-spot location.

17. The medium of claim 16, wherein the output parameters include at least one of a beam angle, a beam width, a speaker gain and a speaker delay.

18. The medium of claim 16, further comprising:
providing the first signal to a first speaker assembly; and
providing the second signal to a second speaker assembly.

19. The medium of claim 18, wherein the first and second loudspeaker assemblies comprise:
an array of a plurality of tweeters;
an array of a plurality of mid-range transducers; and
at least one woofer.

20. The medium of claim 16, further comprising:
receiving an input to move the sweet-spot location from a first location to a second location;
providing a signal to move the first and second steerable audio beams.

\* \* \* \* \*